US012650251B2

(12) United States Patent　　　　　(10) Patent No.: US 12,650,251 B2
Iwata et al.　　　　　　　　　　　　　　(45) Date of Patent: Jun. 9, 2026

(54) HEAT PUMP APPARATUS

(71) Applicant: DAIKIN INDUSTRIES, LTD., Osaka (JP)

(72) Inventors: Ikuhiro Iwata, Osaka (JP); Eiji Kumakura, Osaka (JP); Tetsushi Tsuda, Osaka (JP); Shinjiro Domi, Osaka (JP); Atsushi Yoshimi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 140 days.

(21) Appl. No.: 18/374,254

(22) Filed: Sep. 28, 2023

(65) Prior Publication Data

US 2024/0019177 A1　　Jan. 18, 2024

Related U.S. Application Data

(63) Continuation of application No. PCT/JP2022/015707, filed on Mar. 29, 2022.

(30) Foreign Application Priority Data

Mar. 31, 2021　(JP) ................................. 2021-061279

(51) Int. Cl.
　*F25B 9/00*　　　(2006.01)
　*B60H 1/00*　　　(2006.01)
　*F25B 43/00*　　(2006.01)
(52) U.S. Cl.
　CPC ............ *F25B 9/006* (2013.01); *F25B 43/006* (2013.01); *B60H 1/00392* (2013.01)
(58) Field of Classification Search
　CPC ............................. F25B 9/006; F25B 43/006; F25B 2400/0415; F25B 2600/0251;
　　　　　　　　　　　　　　(Continued)

(56) References Cited

U.S. PATENT DOCUMENTS 5,651,263　A　　7/1997　Nonaka et al.
2016/0087727　A1　　3/2016　Nagatani et al.
(Continued)

FOREIGN PATENT DOCUMENTS

CN　　103939323　A　*　7/2014
CN　　106030219　A　*　10/2016　.............. F25B 41/24
(Continued)

OTHER PUBLICATIONS

Extended European Search Report for European Application No. 22781005.8, dated Aug. 22, 2024.
(Continued)

*Primary Examiner* — Kun Kai Ma
(74) *Attorney, Agent, or Firm* — Birch, Stewart, Kolasch & Birch, LLP

(57)　　　　　　　ABSTRACT

An air conditioner, which is a heat pump apparatus, includes a refrigerant circuit, a compressor, and a composition adjustment mechanism. The refrigerant circuit circulates a non-azeotropic mixture refrigerant including a first refrigerant and a second refrigerant having a boiling point higher than the first refrigerant. The compressor compresses the non-azeotropic mixture refrigerant. The first refrigerant is a compound represented by a molecular formula having one or more carbon-carbon unsaturated bonds. The composition adjustment mechanism is provided in the refrigerant circuit. The composition adjustment mechanism prevents an increase in the rate of the first refrigerant included in the non-azeotropic mixture refrigerant discharged from the compressor.

19 Claims, 19 Drawing Sheets

(58) Field of Classification Search

CPC .................... F25B 2600/11; F25B 2600/2507; F25B 5/04; F25B 6/04; F25B 2600/2513; F25B 49/02; C09K 5/045; C09K 2205/126; C09K 2205/22; C09K 2205/34; B60H 1/00392; B60H 1/3225; B60H 2001/3297; B60H 1/00921; B60H 1/3229

See application file for complete search history.

(56)           References Cited

U.S. PATENT DOCUMENTS

| | | | |
|---|---|---|---|
| 2016/0200170 A1 * | 7/2016 | Kawamoto | B60H 1/00885 62/157 |
| 2016/0355719 A1 * | 12/2016 | Fukushima | F25B 1/00 |
| 2017/0082332 A1 * | 3/2017 | Onaka | F25B 1/00 |
| 2018/0363965 A1 | 12/2018 | Hayamizu et al. | |
| 2020/0254846 A1 * | 8/2020 | Hatakeyama | F25B 41/20 |

FOREIGN PATENT DOCUMENTS

| | | | | |
|---|---|---|---|---|
| CN | 110926050 A | * | 3/2020 | F25B 13/00 |
| EP | 3118289 B1 | * | 7/2019 | C10M 169/04 |
| JP | 57-73576 U | | 5/1982 | |
| JP | S63187059 A | * | 8/1988 | |
| JP | 63-290351 A | | 11/1988 | |
| JP | 5-264131 A | | 10/1993 | |
| JP | 7-324833 A | | 12/1995 | |
| JP | 8-94213 A | | 4/1996 | |
| JP | 9-42806 A | | 2/1997 | |
| JP | H11304267 A | * | 11/1999 | |
| JP | 2002-39648 A | | 2/2002 | |
| JP | 2003269805 A | * | 9/2003 | |
| JP | 2009-180469 A | | 8/2009 | |
| JP | 2011-208860 A | | 10/2011 | |
| JP | 2014-115062 A | | 6/2014 | |
| JP | 2014-119122 A | | 6/2014 | |
| JP | 6390431 B2 | | 9/2018 | |
| WO | WO 2014/181869 A1 | | 11/2014 | |
| WO | WO 2015/140887 A1 | | 9/2015 | |
| WO | WO 2017/145826 A1 | | 8/2017 | |
| WO | WO 2018/229864 A1 | | 12/2018 | |
| WO | WO-2020003494 A1 | * | 1/2020 | F25B 49/02 |
| WO | WO 2020/066001 A1 | | 4/2020 | |

OTHER PUBLICATIONS

International Preliminary Report on Patentability and English translation of the Written Opinion of the International Searching Authority for International Application No. PCT/JP2022/015707, dated Oct. 12, 2023.

International Search Report (PCT/ISA/210) issued in PCT/JP2022/015707, dated Jun. 14, 2022.

* cited by examiner

HEAT PUMP APPARATUS

CROSS REFERENCE TO RELATED APPLICATIONS

This application is a Continuation of PCT International Application No. PCT/JP2022/015707, filed on Mar. 29, 2022, which claims priority under 35 U.S.C. § 119(a) to Patent Application No. JP 2021-061279, filed in Japan on Mar. 31, 2021, all of which are hereby expressly incorporated by reference into the present application.

TECHNICAL FIELD

The present disclosure relates to a heat pump apparatus using a non-azeotropic mixture refrigerant.

BACKGROUND ART

As described in PTL 1 (Japanese Patent No. 6390431), some conventional heat pump apparatuses perform a vapor compression refrigeration cycle using a non-azeotropic mixture refrigerant. The non-azeotropic mixture refrigerant described in PTL 1 is a refrigerant having a mixture of 2,3,3,3-tetrafluoropropene (hereafter may be referred to as HFO-1234yf) and difluoromethane (hereafter may be referred to as R32).

SUMMARY

A heat pump apparatus according to one aspect includes a refrigerant circuit, a compressor, and a composition adjustment mechanism. The refrigerant circuit circulates a non-azeotropic mixture refrigerant including a first refrigerant and a second refrigerant having a boiling point higher than the first refrigerant. The compressor is provided in the refrigerant circuit to compress the non-azeotropic mixture refrigerant. The composition adjustment mechanism is connected to the refrigerant circuit to prevent an increase in a rate of the first refrigerant included in the non-azeotropic mixture refrigerant discharged from the compressor. The first refrigerant is a compound represented by a molecular formula having one or more carbon-carbon unsaturated bonds.

DESCRIPTION OF EMBODIMENTS

First Embodiment (1) Overall Configuration

Figure 1:
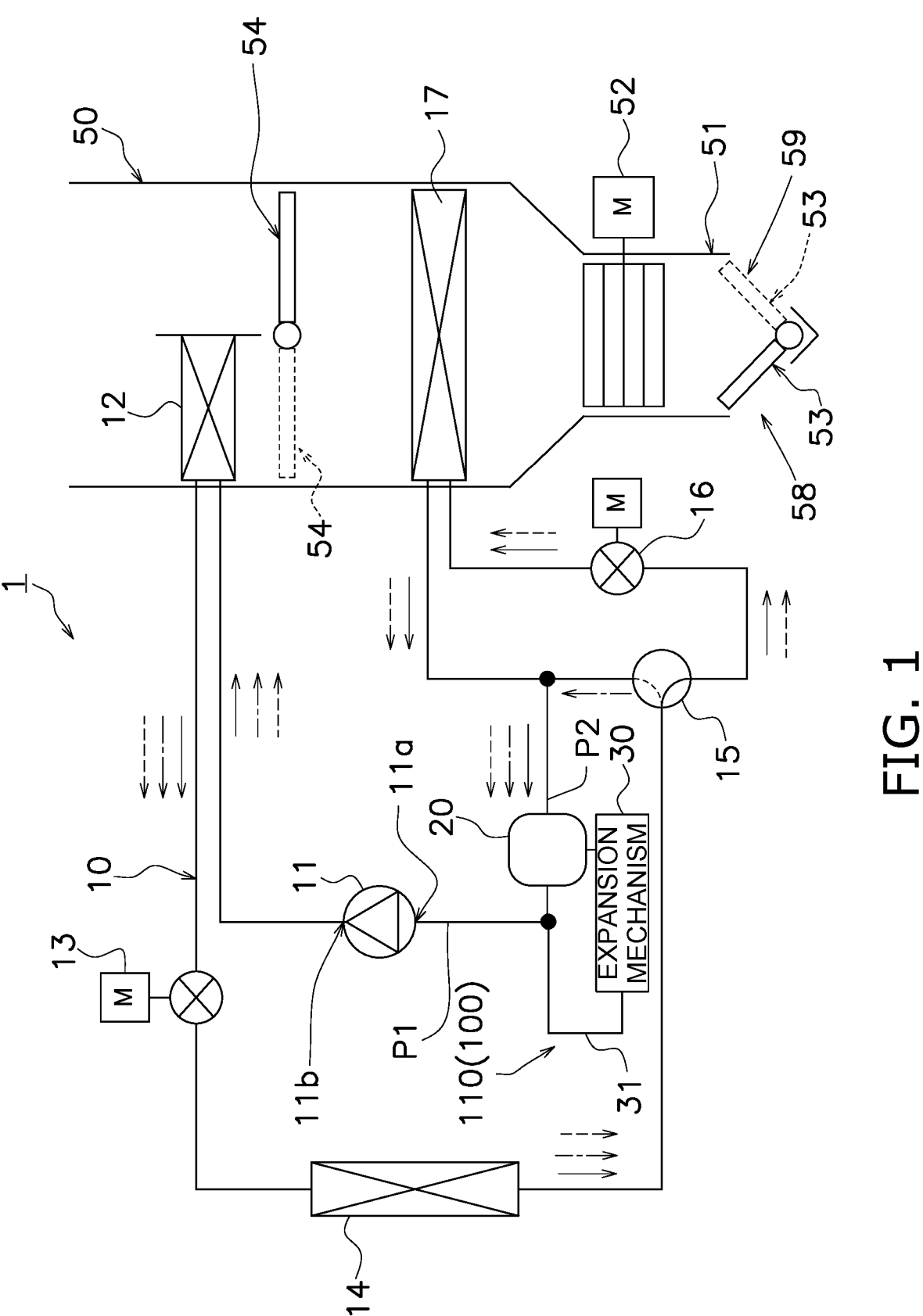
FIG. 1 is a schematic diagram illustrating an example of a configuration of an air conditioner according to a first embodiment.

FIG. 1 illustrates an air conditioner 1 that is a heat pump apparatus according to a first embodiment. The heat pump apparatus according to the present disclosure is an apparatus that performs a vapor compression refrigeration cycle using a non-azeotropic mixture refrigerant. Further, in the following description, the non-azeotropic mixture refrigerant may be abbreviated as a mixture refrigerant. The air conditioner 1 is used for, for example, air conditioning for inside of rooms of buildings, inside of cabins of railroad vehicles, or inside of cabins of electric vehicles. The air conditioner 1 is configured to enable mode switching between a cooling mode, a heating mode, and a dehumidification heating mode. The heat pump apparatus is used for, for example, a water heater, a refrigerator, a washing and drying machine, and a floor heating system in addition to air conditioners.

(1-1) About Non-azeotropic Mixture Refrigerant

The non-azeotropic mixture refrigerant used in the air conditioner 1 is a mixture refrigerant of a first refrigerant including a compound represented by a molecular formula having one or more carbon-carbon unsaturated bonds and a second refrigerant having a boiling point higher than the first refrigerant. In the description of the second and subsequent embodiments, too, in the composition of the non-azeotropic mixture refrigerant, the refrigerant including the compound represented by the molecular formula having one or more carbon-carbon unsaturated bonds is referred to as the first refrigerant, and the refrigerant including the compound having a boiling point higher than the first refrigerant is referred to as the second refrigerant. Therefore, the non-azeotropic mixture refrigerant according to the present disclosure is the mixture refrigerant of the first refrigerant, which includes the above-described compound and has a relatively low boiling point, and the second refrigerant, which has a relatively high boiling point. The non-azeotropic mixture refrigerant including the first refrigerant and the second refrigerant described above includes a first mixture refrigerant, a second mixture refrigerant, and a third mixture refrigerant described below. Further, the non-azeotropic mixture refrigerant may be used together with refrigerating machine oil.

(First Mixture Refrigerant)

The non-azeotropic mixture refrigerant includes the first mixture refrigerant including trans-1,2-difluoroethylene (HFO-1132(E)) and 2,3,3,3-tetrafluoropropene (HFO-1234yf). The boiling point of trans-1,2-difluoroethylene (HFO-1132(E)) is −52.5° C. and the boiling point of 2,3,3,3-tetrafluoropropene (HFO-1234yf) is −29.5° C. Therefore, in the first mixture refrigerant, trans-1,2-difluoroethylene (HFO-1132(E)) is the first refrigerant, and 2,3,3,3-tetrafluoropropene (HFO-1234yf) is the second refrigerant.

Regarding the content rate of each refrigerant in the first mixture refrigerant, for example, the content rate of trans-1,2-difluoroethylene (HFO-1132(E)) is 12.1 to 72.0% by mass, and the content rate of 2,3,3,3-tetrafluoropropene (HFO-1234yf) is 87.9 to 28.0% by mass with respect to the total mass of trans-1,2-difluoroethylene (HFO-1132 (E)) and 2,3,3,3-tetrafluoropropene (HFO-1234yf). The sum of the mass of trans-1,2-difluoroethylene and the mass of 2,3,3,3-tetrafluoropropene is the mass of the non-azeotropic mixture refrigerant, and for example, when the content rate of trans-1,2-difluoroethylene is 20.0% by mass, the content rate of 2,3,3,3-tetrafluoropropene is 80.0% by mass.

(Second Mixture Refrigerant)

Further, the non-azeotropic mixture refrigerant includes the second mixture refrigerant including trifluoroethylene (HFO-1123) and 2,3,3,3-tetrafluoropropene (HFO-1234yf). As the boiling point of trifluoroethylene (HFO-1123) is −56.0° C., HFO-1123 is the first refrigerant and HFO-1234yf is the second refrigerant in the second mixture refrigerant. Even when the second mixture refrigerant includes a compound other than HFO-1123 and HFO-1234yf, the relationship that HFO-1123 is the first refrigerant and HFO-1234yf is the second refrigerant always holds in the second mixture refrigerant. Furthermore, the second mixture refrigerant (non-azeotropic mixture refrigerant) may include a mixture of a plurality of types of first refrigerants and a mixture of a plurality of types of second refrigerants. The composition of the second mixture refrigerant includes first to ninth compositions below.

(First Composition of Second Mixture Refrigerant)

First, the first composition of the second mixture refrigerant will be described. In the first composition of the second mixture refrigerant, the rate of the total amount of trifluoroethylene and 2,3,3,3-tetrafluoropropene with respect to the total amount of the second mixture refrigerant is 70 to 100% by mass, and the rate of trifluoroethylene with respect to the total amount of trifluoroethylene and 2,3,3,3-tetrafluoropropene is 35 to 95% by mass. When the rate of the total amount of HFO-1123 and HFO-1234yf with respect to the total amount of the second mixture refrigerant is less than 100% by mass, the first composition of the second mixture refrigerant further includes a composition for a heat cycle system.

Further, the composition for the heat cycle system in the first composition of the second mixture refrigerant includes 0 to 30% by mass of a heat cycle refrigerant with respect to the total amount of the second mixture refrigerant. The heat cycle refrigerant includes at least one type of compound selected from saturated hydrofluorocarbon and hydrofluorocarbon having a carbon-carbon double bond (excluding trifluoroethylene and 2,3,3,3-tetrafluoropropene).

Further, the composition for the heat cycle system in the first composition of the second mixture refrigerant includes a different compound when the rate of the total amount of trifluoroethylene (HFO-1123), 2,3,3,3-tetrafluoropropene (HFO-1234yf), and the heat cycle refrigerant with respect to the total amount of the second mixture refrigerant is less than 100% by mass. The different compound is at least one type of compound selected from the group consisting of carbon dioxide, hydrocarbon, chlorofluoroolefin (CFO), and hydrochlorofluoroolefin (HCFO).

(Second Composition of Second Mixture Refrigerant)

The second composition of the second mixture refrigerant is a composition in which the rate of the total amount of trifluoroethylene and 2,3,3,3-tetrafluoropropene with respect to the total amount of the second mixture refrigerant is 80 to 100% by mass in the first composition of the second mixture refrigerant described above.

(Third Composition of Second Mixture Refrigerant)

The third composition of the second mixture refrigerant is a composition in which the rate of trifluoroethylene with respect to the total amount of trifluoroethylene and 2,3,3,3-tetrafluoropropene is 40 to 95% by mass in the first composition of the second mixture refrigerant or the second composition of the second mixture refrigerant described above.

(Fourth Composition of Second Mixture Refrigerant)

The fourth composition of the second mixture refrigerant is a composition in which the rate of trifluoroethylene with respect to the total amount of the second mixture refrigerant is 70% by mole or less in any composition of the first composition of the second mixture refrigerant to the third composition of the second mixture refrigerant described above.

(Fifth Composition of Second Mixture Refrigerant)

The fifth composition of the second mixture refrigerant is a composition in which the hydrofluorocarbon having a carbon-carbon double bond is at least one type selected from the group consisting of 1,2-difluoroethylene, 2-fluoropropene, 1,1,2-trifluoropropene, trans-1,2,3,3,3-pentafluoropropene, cis-1,2,3,3,3-pentafluoropropene, trans-1,3,3,3-tetrafluoropropene, cis-1,3,3,3-tetrafluoropropene, and 3,3,3-trifluoropropene in any composition of the first composition of the second mixture refrigerant to the fourth composition of the second mixture refrigerant described above.

(Sixth Composition of Second Mixture Refrigerant)

The sixth composition of the second mixture refrigerant is the composition in which the hydrofluorocarbon having a carbon-carbon double bond is trans-1,3,3,3-tetrafluoropropene in any composition of the first composition of the second mixture refrigerant to the fifth composition of the second mixture refrigerant described above.

(Seventh Composition of Second Mixture Refrigerant)

The seventh composition of the second mixture refrigerant is a composition in which the saturated hydrofluorocarbon is at least one type selected from the group consisting of difluoromethane, 1,1-difluoro ethane, 1,1,1 -trifluoroethane, 1,1,2,2-tetrafluoro ethane, 1,1,1,2-tetrafluoroethane, and pentafluoroethane in any composition of the first composition of the second mixture refrigerant to the sixth composition of the second mixture refrigerant described above.

(Eighth Composition of Second Mixture Refrigerant)

The eighth composition of the second mixture refrigerant is a composition in which the saturated hydrofluorocarbon is at least one type selected from the group consisting of difluoromethane, 1,1,1,2-tetrafluoroethane, and pentafluoroethane in any composition of the first composition of the second mixture refrigerant to the seventh composition of the second mixture refrigerant described above.

(Ninth Composition of Second Mixture Refrigerant)

The ninth composition of the second mixture refrigerant is a composition in which, in any composition of the first composition of the second mixture refrigerant to the eighth composition of the second mixture refrigerant described above, the saturated hydrofluorocarbon is difluoromethane, the rate of trifluoroethylene with respect to the total amount of trifluoroethylene, 2,3,3,3-tetrafluoropropene, and difluoromethane is 30 to 80% by mass, the rate of 2,3,3,3-tetrafluoropropene is 40% or less by mass, the rate of difluoromethane is 30% or less by mass, and the rate of trifluoroethylene with respect to the total amount of the working media is 70% or less by mole.

(Third Mixture Refrigerant)

The non-azeotropic mixture refrigerant includes the third mixture refrigerant including trifluoroethylene (HFO-1123), difluoromethane (R32), and 1,3,3,3-tetrafluoropropene (HFO-1234ze). As the boiling point of trifluoroethylene (HFO-1123) is −56.0° C. and the boiling point of 1,3,3,3-tetrafluoropropene (HFO-1234ze) is −19° C., HFO-1123 is the first refrigerant and HFO-1234ze is the second refrigerant in the third mixture refrigerant. Even when the third mixture refrigerant includes a compound other than HFO-1123 and HFO-1234ze, the relationship that HFO-1123 is the first refrigerant and HFO-1234ze is the second refrigerant always holds in the third mixture refrigerant. Furthermore, the third mixture refrigerant (non-azeotropic mixture refrigerant) may include a mixture of a plurality of types of first refrigerants and a mixture of a plurality of types of second refrigerants. The composition of the third mixture refrigerant includes first to fifth compositions below.

(First Composition of Third Mixture Refrigerant)

First, the first composition of the third mixture refrigerant will be described. In the first composition of the third mixture refrigerant, the rate of the total amount of trifluoroethylene, difluoromethane, and 1,3,3,3-tetrafluoropropene with respect to the total amount of the third mixture refrigerant is more than 90% by mass and 100% or less by mass. In the first composition of the third mixture refrigerant, with respect to the total amount of trifluoroethylene, difluoromethane, and 1,3,3,3-tetrafluoropropene, the rate of trifluoroethylene is more than 0% by mass and 50% or less by mass, the rate of difluoromethane is more than 0% by mass and 40% or less by mass, and the rate of 1,3,3,3-tetrafluoropropene is 40% or more by mass and 90% or less by mass.

(Second Composition of Third Mixture Refrigerant)

The second composition of the third mixture refrigerant is a composition in which, in the above-described first composition of the third mixture refrigerant, the rate of trifluoroethylene with respect to the total amount of trifluoroethylene, difluoromethane, and 1,3,3,3-tetrafluoropropene is more than 0% by mass and 20% or less by mass, the rate of difluoromethane is more than 0% by mass and 20% or less by mass, and the rate of 1,3,3,3-tetrafluoropropene is 65% or more by mass and 90% or less by mass.

(Third Composition of Third Mixture Refrigerant)

The third composition of the third mixture refrigerant is a composition in which 1,3,3,3-tetrafluoropropene includes 60% or more by mass of trans-1,3,3,3-tetrafluoropropene in the first composition of the third mixture refrigerant or the second composition of the third mixture refrigerant described above.

(Fourth Composition of Third Mixture Refrigerant)

The fourth composition of the third mixture refrigerant is a composition including 2,3,3,3-tetrafluoropropene in any composition of the first composition of the third mixture refrigerant to the third composition of the third mixture refrigerant described above.

(Fifth Composition of Third Mixture Refrigerant)

The third mixture refrigerant of the fifth composition is a refrigerant having any composition of the first composition of the third mixture refrigerant to the fourth composition of the third mixture refrigerant described above and is a refrigerant including trifluoroethylene, difluoromethane, and 1,3,3,3-tetrafluoropropene.

(1-2) Outline of Configuration of Air Conditioner 1

As illustrated in FIG. 1, the air conditioner 1 includes a refrigerant circuit 10, which circulates the non-azeotropic mixture refrigerant, and a compressor 11. In the refrigerant circuit the compressor 11 compresses the non-azeotropic mixture refrigerant. The refrigerant circuit 10 is provided with a first heat exchanger 12, a first expansion valve 13, a second heat exchanger 14, a three-way valve 15, a second expansion valve 16, a third heat exchanger 17, and an accumulator 20. For example, a scroll compressor or a rotary compressor may be used as the compressor 11. The first expansion valve 13 and the second expansion valve 16 are, for example, electric valves and are expansion valves whose opening degrees may be changed under the control of a controller 90 described below. The three-way valve 15 is, for example, an electric valve and may switch an internal channel under the control of the controller 90 described below.

The air conditioner 1 includes an indoor unit 50 that supplies conditioned air to an air-conditioning target space inside a cabin. The indoor unit 50 includes a casing 51. The first heat exchanger 12, the third heat exchanger 17, a fan 52, a first air passage switching device 53, and a second air passage switching device 54 are provided in the casing 51 of the indoor unit 50.

Figure 2:
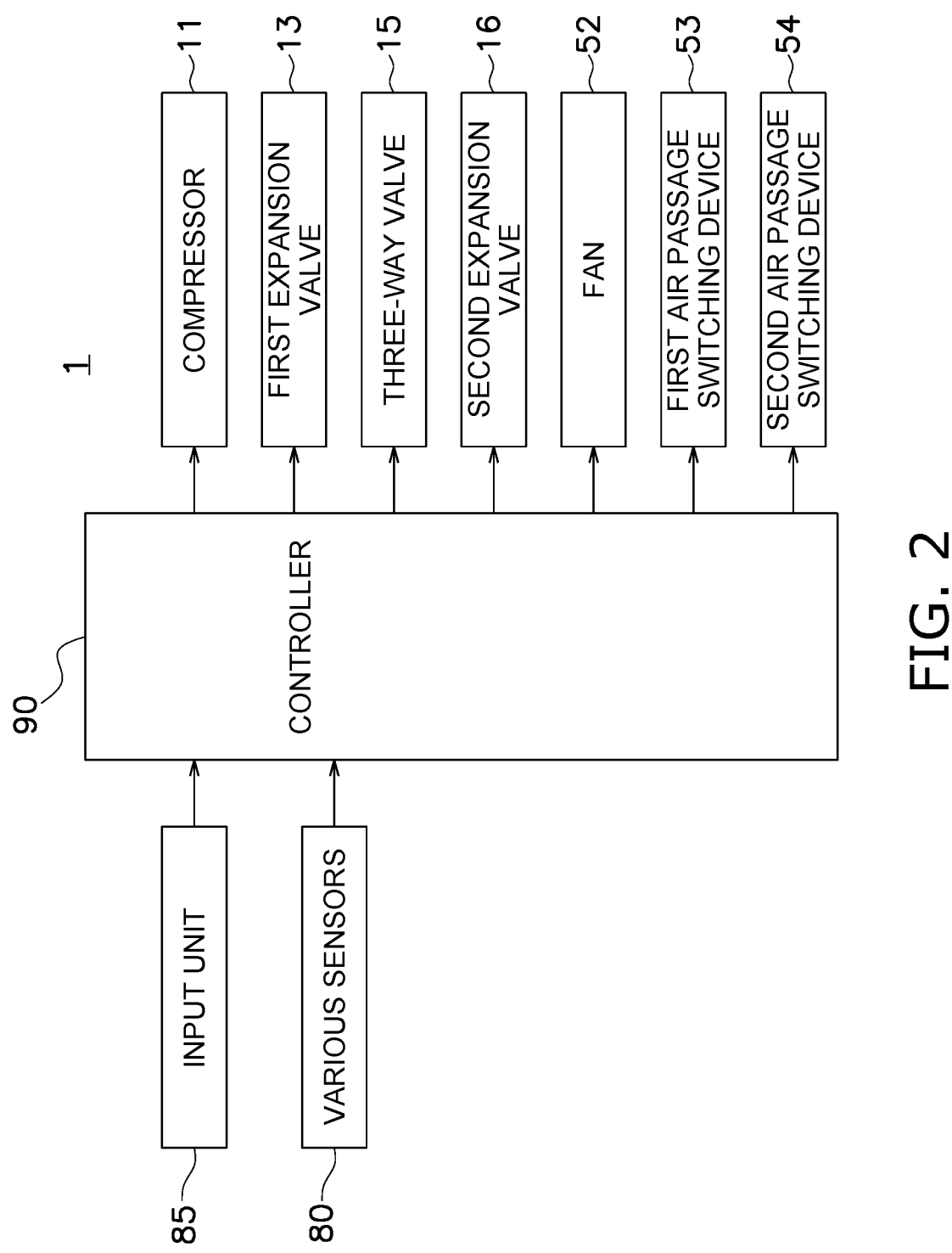
FIG. 2 is a block diagram illustrating control of a controller according to the first embodiment.

As illustrated in FIG. 2, the air conditioner 1 includes the controller 90 that determines the state of the refrigerant circuit 10 and the environment by using various sensors 80 and controls devices provided in the refrigerant circuit 10 and the indoor unit 50. The air conditioner 1 may include, for example, a temperature sensor, a pressure sensor, a sensor that detects leakage of the refrigerant, and other sensors as the various sensors 80. The temperature sensors include, for example, a temperature sensor that detects the temperature of the air blown from the indoor unit 50, a temperature sensor that detects the air temperature inside the cabin, a temperature sensor that detects the air temperature outside the vehicle, and a temperature sensor that detects the temperature of the mixture refrigerant flowing through each unit of the refrigerant circuit 10. The pressure sensor includes, for example, a pressure sensor that detects the pressure of the mixture refrigerant flowing through a predetermined area of the refrigerant circuit 10. The controller 90 is connected to an input unit 85 that inputs information necessary for determining a control target. The input unit 85 inputs, for example, a setting temperature inside the cabin and the air volume blown from the indoor unit 50.

The controller 90 controls the compressor 11, the first expansion valve 13, the three-way valve 15, the second expansion valve 16, the fan 52, the first air passage switching device 53, and the second air passage switching device 54. The above-described devices controlled by the controller 90 are devices related to the non-azeotropic mixture refrigerant circulating in the refrigerant circuit 10. The controller 90 controls the compressor 11 to be turned on or off. The controller 90 is configured to control the number of rotations of the compressor 11 when the number of rotations of the compressor 11 is variable. The controller 90 controls the opening degrees of the first expansion valve 13 and the second expansion valve 16. The controller 90 switches the connecting state of the three-way valve 15. The controller 90 controls the number of rotations of the fan 52 and controls the volume of air blown from the indoor unit 50. The controller 90 switches the first air passage switching device 53 and the second air passage switching device 54.

The controller 90 is implemented by a computer. The controller 90 includes, for example, an arithmetic controller and a storage device. A processor such as a CPU or a GPU may be used as the arithmetic controller. The arithmetic controller reads a program stored in the storage device and performs predetermined image processing and calculation processing in accordance with the program. Further, the arithmetic controller may write a calculation result to the storage device and read information stored in the storage device in accordance with the program. The storage device may be used as a database.

The refrigerant circuit 10 may switch a circulation route of the mixture refrigerant with the three-way valve 15. The three-way valve 15 switches between the state of connecting the second heat exchanger 14 and the accumulator 20 and the state of connecting the second heat exchanger 14 and the second expansion valve 16. When the three-way valve 15 is in the state of connecting the second heat exchanger 14 and the accumulator 20, the second expansion valve 16 is closed, and the mixture refrigerant does not flow from the three-way valve 15 to the accumulator 20 via the second expansion valve 16 and the third heat exchanger 17. When the three-way valve 15 is in the state of connecting the second heat exchanger 14 and the second expansion valve 16, the mixture refrigerant flows from the three-way valve 15 to the accumulator 20 via the second expansion valve 16 and the third heat exchanger 17.

(1-3) Operation in Each Mode of Air Conditioner 1

The refrigerant circuit 10 has a first route through which the mixture refrigerant flows in the heating mode and a second route through which the mixture refrigerant flows in the cooling mode and the dehumidification heating mode. The mixture refrigerant flowing through the first route flows in the direction indicated by the arrow of a dashed-dotted line in FIG. 1. The mixture refrigerant flowing through the second route flows in the direction indicated by the arrows of a solid line and a broken line in FIG. 1.

In the first route of the heating mode, the mixture refrigerant flows through the compressor 11, the first heat exchanger 12, the first expansion valve 13, the second heat exchanger 14, the three-way valve 15, the accumulator 20, and the compressor 11 in this order.

In the second route of the cooling mode and the dehumidification heating mode, the mixture refrigerant flows through the compressor 11, the first heat exchanger 12, the first expansion valve 13, the second heat exchanger 14, the three-way valve 15, the second expansion valve 16, the third heat exchanger 17, the accumulator 20, and the compressor 11 in this order.

In the first route through which the mixture refrigerant passes in the heating mode, the gaseous mixture refrigerant is suctioned from a suction port of the compressor 11 and is compressed. The gaseous mixture refrigerant compressed by the compressor 11 is discharged from a discharge port 11*b* of the compressor 11. The mixture refrigerant discharged from the discharge port 11*b* of the compressor 11 is sent to the first heat exchanger 12. In the heating mode, the mixture refrigerant exchanges heat with the air blown out into the inside of the cabin in the first heat exchanger 12. The mixture refrigerant after heat exchange in the first heat exchanger 12 is decompressed by the first expansion valve 13. The mixture refrigerant after decompression by the first expansion valve 13 exchanges heat with the air outside the vehicle in the second heat exchanger 14. The mixture refrigerant after heat exchange in the second heat exchanger 14 flows into the accumulator 20 via the three-way valve 15. In the accumulator 20, the mixture refrigerant in a gas-liquid two-phase state is separated into gas and liquid. The mixture refrigerant after the gas-liquid separation is suctioned into the compressor 11.

In the heating mode, the second air passage switching device 54 is switched so that the air blown from the indoor unit 50 passes through the first heat exchanger 12. In other words, the second air passage switching device 54 performs switching to the state indicated in the solid line in FIG. 1 and causes the airflow generated by the fan 52 to flow into the first heat exchanger 12. In the heating mode, the air subjected to heat exchange in the first heat exchanger 12 is blown out as warm air into the inside of the cabin. In the heating mode, the first heat exchanger 12 functions as a condenser. In the heating mode, the second expansion valve 16 is fully closed, and the mixture refrigerant does not flow into the third heat exchanger 17. Therefore, the air blown out into the room is not subjected to heat exchange in the third heat exchanger 17.

In the second route through which the mixture refrigerant passes in the cooling mode, the gaseous mixture refrigerant is suctioned from the suction port of the compressor 11 and is compressed. The gaseous mixture refrigerant compressed by the compressor 11 is discharged from the discharge port 11*b* of the compressor 11. The mixture refrigerant discharged from the discharge port 11*b* of the compressor 11 is sent to the first heat exchanger 12. In the cooling mode, the mixture refrigerant does not exchange heat in the first heat exchanger 12. The mixture refrigerant having passed through the first heat exchanger 12 passes through the first expansion valve 13 that is fully opened. The mixture refrigerant having passed through the first expansion valve 13 without being decompressed exchanges heat with the air outside the vehicle in the second heat exchanger 14. The mixture refrigerant after heat exchange in the second heat exchanger 14 is decompressed by the second expansion valve 16 via the three-way valve 15.

The mixture refrigerant after decompression by the second expansion valve 16 exchanges heat with the air blown out into the inside of the cabin in the third heat exchanger 17. The mixture refrigerant after heat exchange in the third heat exchanger 17 flows into the accumulator 20. In the accumulator 20, the mixture refrigerant in a gas-liquid two-phase state is separated into gas and liquid. The mixture refrigerant after the gas-liquid separation is suctioned into the compressor 11.

In the cooling mode, the second air passage switching device 54 is switched so that the air blown from the indoor unit 50 does not pass through the first heat exchanger 12. In other words, the second air passage switching device 54 performs switching to the state indicated in the dotted line in FIG. 1 and blocks the airflow generated by the fan 52 so as not to flow to the first heat exchanger 12. In the cooling mode, the air subjected to heat exchange in the third heat exchanger 17 is blown out into the inside of the cabin as cold air. In the cooling mode, the third heat exchanger 17 functions as an evaporator. In the cooling mode, the first expansion valve 13 is fully opened, and pressure reduction does not occur in the first expansion valve 13.

In the dehumidification heating mode, the mixture refrigerant circulates through the second route as in the cooling mode. The state of the second air passage switching device 54 is different between the dehumidification heating mode and the cooling mode. In the dehumidification heating mode, the state of the second air passage switching device 54 is switched to the state indicated in the solid line in FIG. 1. In other words, in the dehumidification heating mode, the second air passage switching device 54 is switched to the state in which the air blown from the indoor unit 50 passes through the first heat exchanger 12. In this state, the air cooled by the third heat exchanger 17 is dehumidified due to the occurrence of moisture condensation. The dehumidified air is heated by passing through the first heat exchanger 12 and is blown out into the inside of the cabin.

In the second route through which the mixture refrigerant passes in the dehumidification heating mode, the gaseous mixture refrigerant is suctioned from the suction port of the compressor 11 and is compressed. The gaseous mixture refrigerant compressed by the compressor 11 is discharged from the discharge port 11b of the compressor 11. The mixture refrigerant discharged from the discharge port 11b of the compressor 11 is sent to the first heat exchanger 12. In the dehumidification heating mode, the mixture refrigerant exchanges heat with the air discharged into the inside of the cabin in the first heat exchanger 12. The mixture refrigerant having passed through the first heat exchanger 12 is decompressed by the first expansion valve 13. The mixture refrigerant after decompression by the first expansion valve 13 exchanges heat with the air outside the vehicle in the second heat exchanger 14. The mixture refrigerant after heat exchange in the second heat exchanger 14 is decompressed by the second expansion valve 16 via the three-way valve 15. The mixture refrigerant after decompression by the second expansion valve 16 exchanges heat with the air blown out into the inside of the cabin in the third heat exchanger 17. The mixture refrigerant after heat exchange in the third heat exchanger 17 flows into the accumulator 20. In the accumulator 20, the mixture refrigerant in a gas-liquid two-phase state is separated into gas and liquid. The mixture refrigerant after the gas-liquid separation is suctioned into the compressor 11. In the dehumidification heating mode, the air cooled and dehumidified by the third heat exchanger 17 is heated by the first heat exchanger 12 and blown out into the inside of the cabin.

The indoor unit 50 includes a first air intake port 58 and a second air intake port 59 to take in the air subjected to heat exchange in the first heat exchanger 12 or the third heat exchanger 17. The first air intake port 58 communicates with the inside of the cabin, and the second air intake port 59 communicates with the outside of the vehicle. The first air passage switching device 53 may switch the first air intake port 58 to a closed state (the state indicated in the solid line in FIG. 1) so that the air may be taken in from the outside of the vehicle. Further, the first air passage switching device 53 may switch the first air intake port 58 to a closed state (the state indicated in the solid line in FIG. 1) so that the air may be taken in from the outside of the vehicle. The air taken in from the first air intake port 58 or the second air intake port 59 passes through the fan 52 and the third heat exchanger 17. The air having passed through the third heat exchanger 17 passes through the first heat exchanger 12 or is blown out into the inside of the cabin without passing through the first heat exchanger 12 in accordance with the switching state of the second air passage switching device 54.

(1-4) Composition Adjustment Mechanism 100

Figure 3:
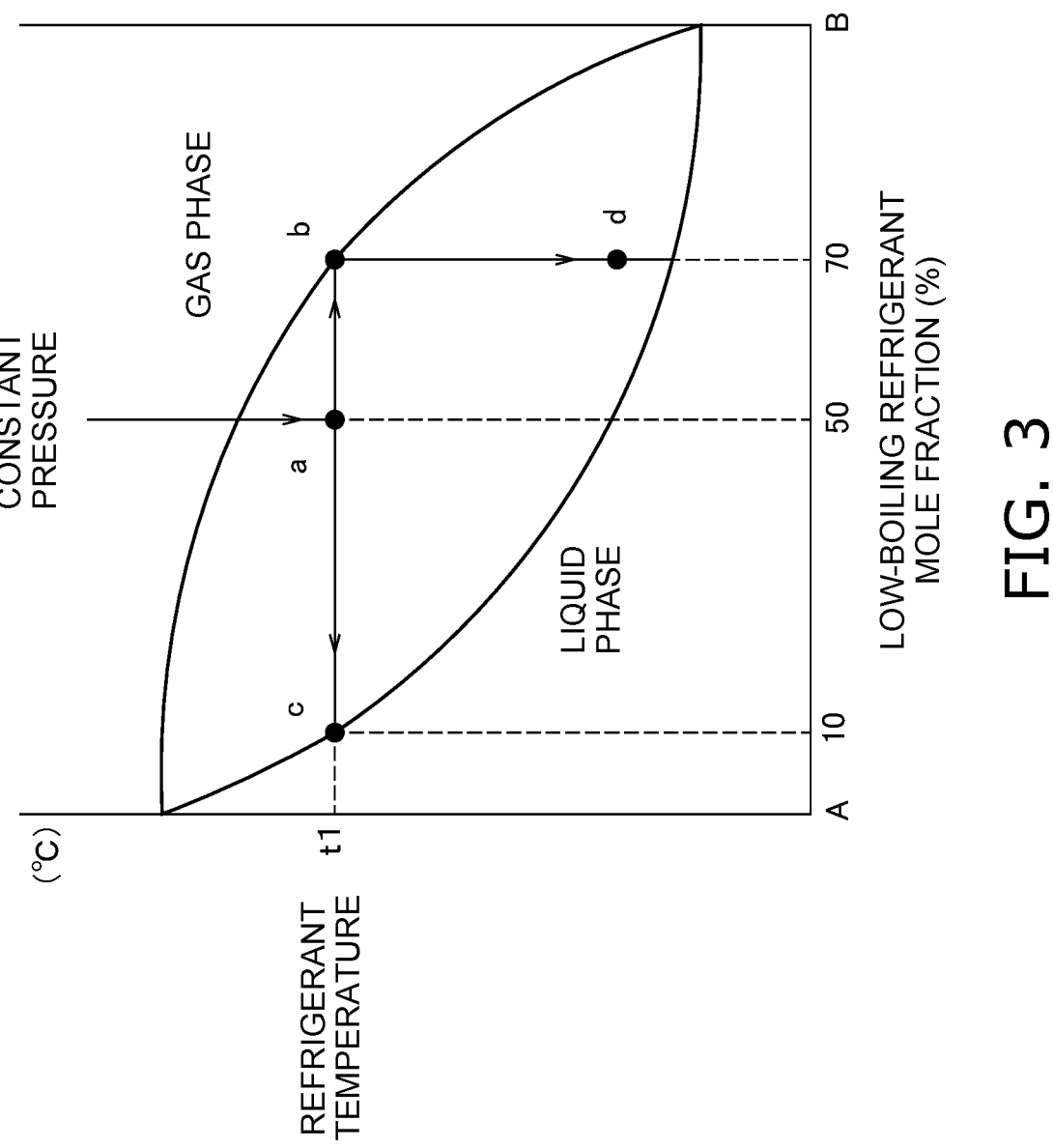
FIG. 3 is a vapor-liquid equilibrium diagram of a non-azeotropic mixture refrigerant.

A composition adjustment mechanism 100 is provided in the refrigerant circuit 10. The composition adjustment mechanism 100 is a mechanism that prevents an increase in the rate of the first refrigerant included in the non-azeotropic mixture refrigerant discharged from the compressor 11. The composition of the non-azeotropic mixture refrigerant is a prescribed composition when the air conditioner 1 is installed. However, the non-azeotropic mixture refrigerant is liquefied or vaporized in the process of repeated compression and expansion, and thus the composition may be changed in the refrigerant circuit 10. FIG. 3 is a vapor-liquid equilibrium diagram of the non-azeotropic mixture refrigerant. When the refrigerant temperature is t1° C. at a constant pressure, the gaseous non-azeotropic mixture refrigerant and the liquid non-azeotropic mixture refrigerant are present at a point a, and the mole fraction of the first refrigerant therein is 50%. At the same refrigerant temperature of t1° C., the first refrigerant present in the gaseous non-azeotropic mixture refrigerant at a point b is 70%, and the first refrigerant present in the liquid non-azeotropic mixture refrigerant at a point c is 10%. Furthermore, the mole fraction of the first refrigerant at a point d is identical to that as the point b, but the refrigerant temperature is lower, and the non-azeotropic mixture refrigerant at the point d is in a gas-liquid two-phase state in which the liquid and gaseous non-azeotropic mixture refrigerants are mixed.

In the accumulator 20, when the gaseous non-azeotropic mixture refrigerant and the liquid non-azeotropic mixture refrigerant are separated from each other and enter an equilibrium state, the non-azeotropic mixture refrigerant in the state of the point b and the non-azeotropic mixture refrigerant in the state of the point c are present. As the non-azeotropic mixture refrigerant flows into and out of the accumulator 20, an ideal gas-liquid equilibrium state is not obtained in the accumulator 20. However, as there is the tendency illustrated in FIG. 3, the rate of the first refrigerant present in the liquid non-azeotropic mixture refrigerant accumulated in the accumulator 20 is lower than the rate of the first refrigerant in the non-azeotropic mixture refrigerant having entered the accumulator 20 in a gas-liquid two-phase state. Therefore, when the liquid non-azeotropic mixture refrigerant is accumulated in the accumulator 20, the rate of the first refrigerant in the non-azeotropic mixture refrigerant circulating in the refrigerant circuit 10 other than the accumulator 20 becomes higher.

The composition adjustment mechanism 100 according to the first embodiment is an extraction mechanism 110 that prevents an increase in the rate of the first refrigerant entering the suction port of the compressor 11 as compared with the rate of the first refrigerant included in the non-azeotropic mixture refrigerant entering the accumulator 20. The extraction mechanism 110 illustrated in FIG. 1 is a mechanism that extracts the liquid non-azeotropic mixture refrigerant from the accumulator 20 and flow the liquid non-azeotropic mixture refrigerant toward the compressor 11. The extraction mechanism 110 reduces the liquid non-azeotropic mixture refrigerant accumulated in the accumulator 20 and thus prevents the rate of the first refrigerant entering the suction port of the compressor 11 from becoming higher.

(2) Detailed Configuration (2-1) Extraction Mechanism 110

Figure 4:
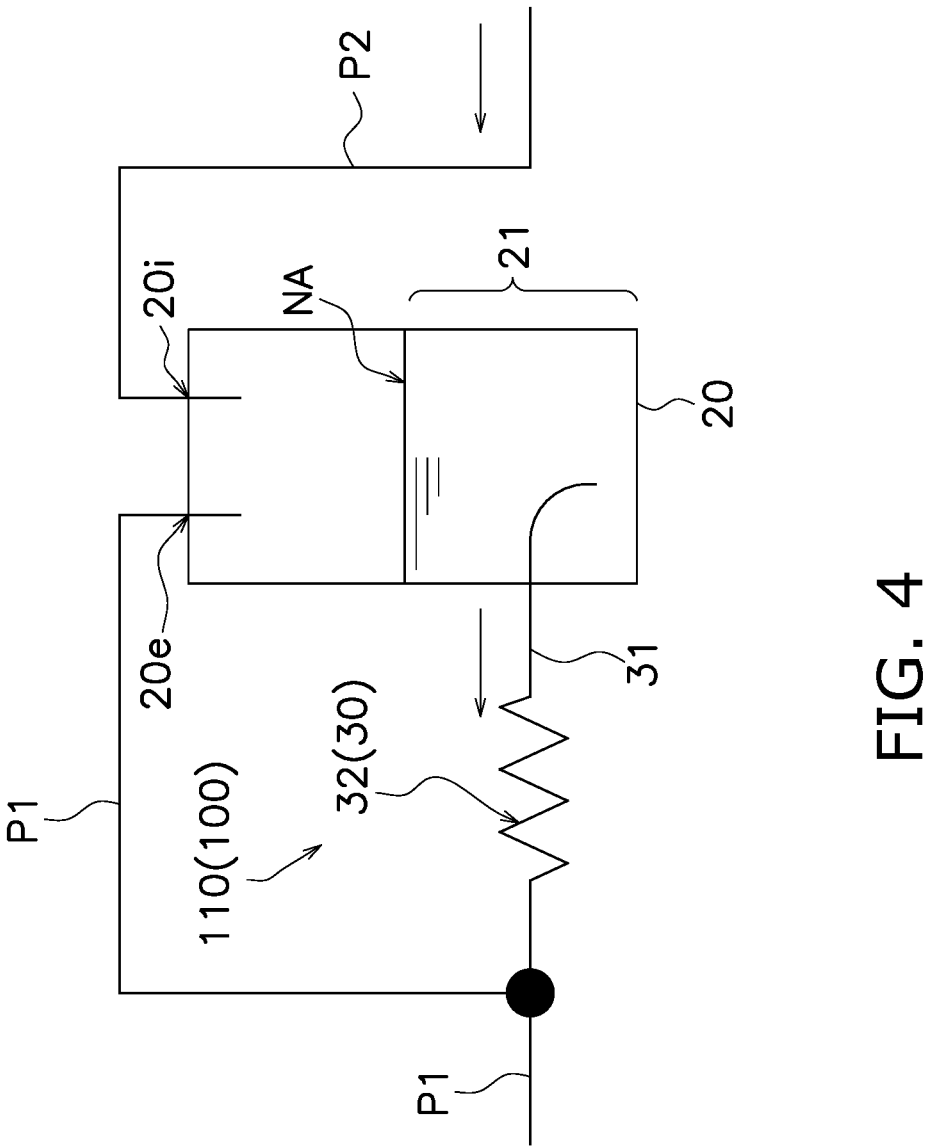
FIG. 4 is a schematic diagram illustrating an example of a composition adjustment mechanism of FIG. 1.

The extraction mechanism 110 is a mechanism that extracts the liquid non-azeotropic mixture refrigerant from the accumulator 20. As illustrated in FIG. 4, the accumulator 20 includes an outlet 20e connected to a first channel P1 connected to a suction port 11a of the compressor 11 and an inlet 20i into which the non-azeotropic mixture refrigerant flows. The liquid non-azeotropic mixture refrigerant separated by the accumulator 20 is accumulated in a liquid accumulation portion 21 of the accumulator 20. The liquid accumulation portion 21 is provided in a bottom portion that is positioned in a lower portion of the accumulator 20 in the gravity direction. The extraction mechanism 110 includes an expansion mechanism 30 and an extraction channel 31. The extraction channel 31 is a channel connecting the liquid accumulation portion 21 of the accumulator 20 and the first channel P1. The liquid non-azeotropic mixture refrigerant accumulated in the liquid accumulation portion 21 may enter the first channel P1 through the extraction channel 31. The extraction channel 31 is provided with the expansion mechanism 30. A large amount of liquid mixture refrigerant returning to the compressor 11 may damage the compressor 11. Therefore, the expansion mechanism 30 adjusts the amount of liquid mixture refrigerant to be extracted by the extraction mechanism 110. For example, a capillary tube 32 is used as the expansion mechanism 30. The mixture refrigerant passing through the capillary tube 32 is decompressed and expanded. The capillary tube 32 may return an appropriate amount of liquid mixture refrigerant to the compressor 11 so as not to damage the compressor 11. The liquid non-azeotropic mixture refrigerant accumulated in the accumulator 20 is returned as the mixture refrigerant circulating in the refrigerant circuit so that it is possible to prevent an increase in the rate of the first refrigerant included in the non-azeotropic mixture refrigerant discharged from the compressor 11.

(3) Modification (3-1) Modification 1A

Figure 5:
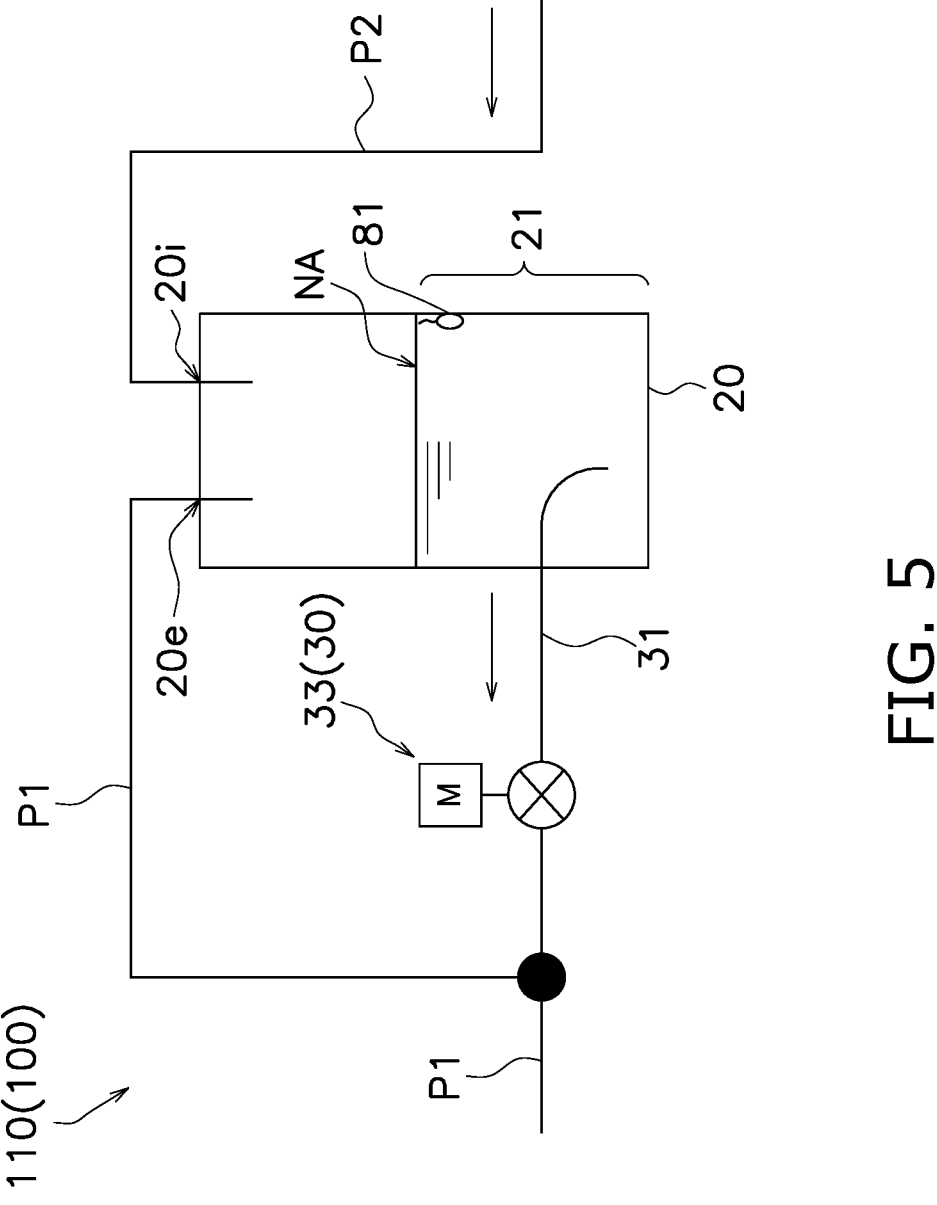
FIG. 5 is a schematic diagram illustrating another example of the composition adjustment mechanism of FIG. 1.

In the case described according to the above first embodiment, the capillary tube 32 is used as the expansion mechanism 30. However, the expansion mechanism 30 is not limited to the capillary tube 32. As illustrated in FIG. 5, an electric expansion valve 33 may also be used as the expansion mechanism 30. The electric expansion valve 33 is controlled by the controller For example, the controller 90 may be configured to perform control to increase the opening degree of the electric expansion valve 33 and return the liquid non-azeotropic mixture refrigerant accumulated in the accumulator 20 to the first channel P1 during the operation when the degree of superheating of the suction port 11a of the compressor 11 is higher than a predetermined value. When such a control is performed, a large amount of liquid mixture refrigerant is not suctioned into the compressor 11, and thus it is possible to prevent damages to the compressor 11 due to a large amount of liquid mixture refrigerant suctioned. In the configuration, the degree of superheating of the suction port 11a of the compressor 11 may be detected by using the various sensors 80 that are conventionally known.

Alternatively, the controller 90 may be configured to perform control to open the electric expansion valve 33 when a predetermined amount or more of liquid non-azeotropic mixture refrigerant is accumulated. In order to detect whether a predetermined amount or more of liquid non-azeotropic mixture refrigerant is accumulated, a configuration may be such that, for example, a liquid refrigerant detection sensor 81 is provided to detect the liquid mixture refrigerant accumulated in the liquid accumulation portion 21. For example, a liquid level sensor or a thermistor may be used as the liquid refrigerant detection sensor 81.

(4) Feature

In the air conditioner 1 according to the first embodiment and the modification 1A, the extraction mechanism 110 may extract the liquid non-azeotropic mixture refrigerant from the liquid accumulation portion 21 of the accumulator 20 and flow the liquid non-azeotropic mixture refrigerant to the first channel P1. By this action, the liquid non-azeotropic mixture refrigerant accumulated in the accumulator 20 may be reduced. As a result, it is possible to prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Further, the air conditioners 1 according to the first embodiment and the modification 1A are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Furthermore, the air conditioner 1 may be an in-vehicle air conditioner applied to an electric vehicle. The refrigerant circuit 10 of the air conditioner 1 is provided with the first heat exchanger 12 as an indoor heat exchanger that exchanges heat between the non-azeotropic mixture refrigerant discharged from the compressor 11 and the air inside the cabin of the electric vehicle. Hereinafter, the air conditioners 1 according to a second embodiment to a ninth embodiment may also be applied to electric vehicles in the same manner as the first embodiment. In the air conditioner 1 in which the first heat exchanger 12 is an indoor heat exchanger that exchanges heat with the air blown out into the inside of the cabin, it is possible to reduce the risk of failures occurring inside the cabin due to an increase in the rate of the first refrigerant in the indoor heat exchanger.

Second Embodiment

(5) Overall Configuration

Figure 6:
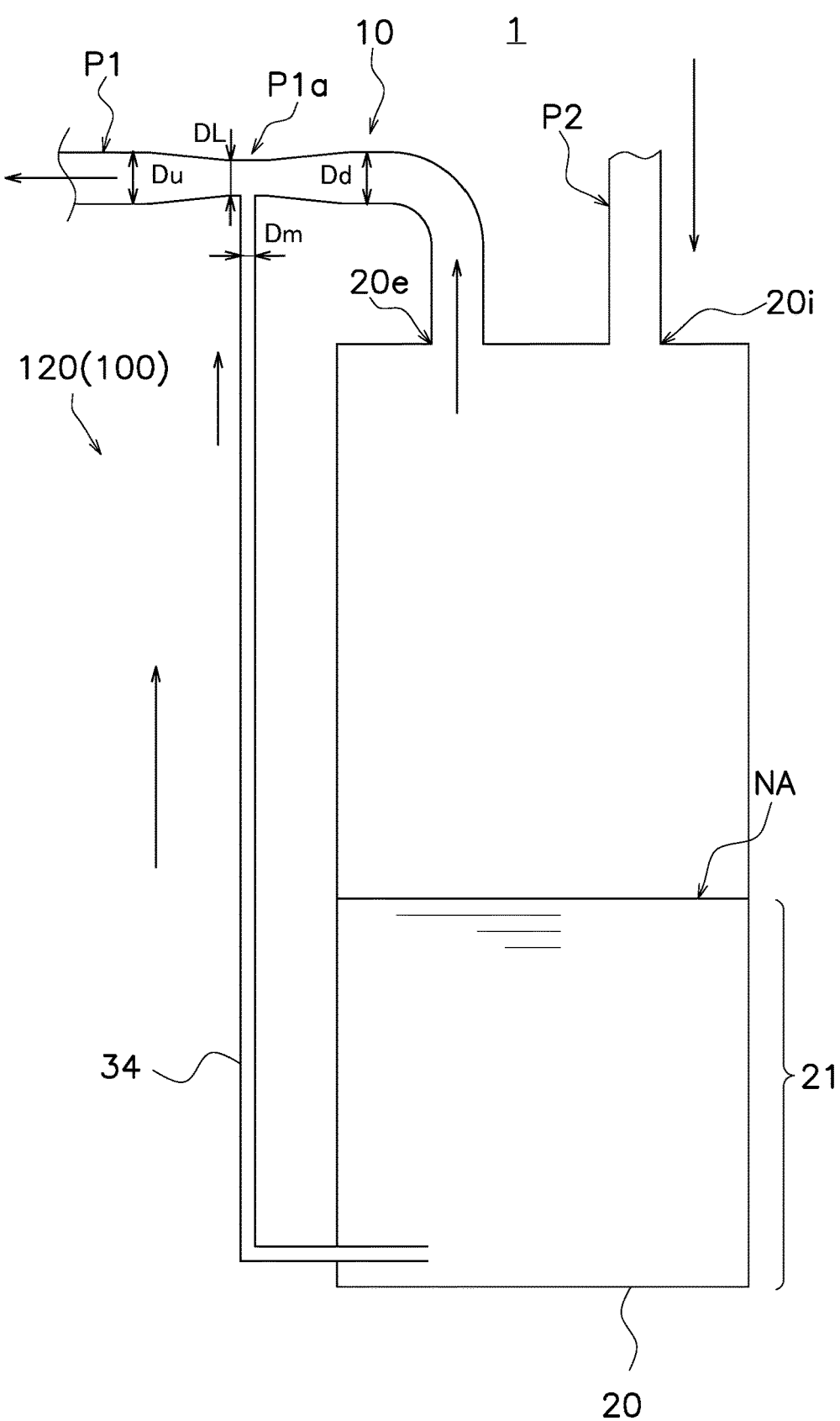
FIG. 6 is a schematic view illustrating an example of the composition adjustment mechanism according to a second embodiment.

The air conditioner 1 according to the second embodiment is different from the air conditioner 1 according to the first embodiment in the configuration of the composition adjustment mechanism 100, but is the same in the other configurations. As illustrated in FIG. 6, the composition adjustment mechanism 100 included in the air conditioner 1 according to the second embodiment includes an extraction mechanism 120 different from the extraction mechanism 110 according to the first embodiment. As the configuration of the air conditioner 1 according to the second embodiment other than the extraction mechanism 120 is the same as those of the air conditioner 1 according to the first embodiment, the outline of the configuration of the air conditioner 1 according to the second embodiment other than the extraction mechanism 120 is the same as the outline described in (1-2) above. Furthermore, the operation in each mode of the air conditioner 1 according to the second embodiment is also the same as the operation described in (1-3) above. Furthermore, the non-azeotropic mixture refrigerant used in the air conditioner 1 according to the second embodiment may be the same as the non-azeotropic mixture refrigerant described in (1-1) above.

(6) Configuration and Operation of Extraction Mechanism 120

The extraction mechanism 120 includes a small-diameter portion P1a provided in the first channel P1 and a small-diameter pipe 34 connected to the small-diameter portion P1a. The small-diameter pipe 34 is a pipe connecting the small-diameter portion P1a and the liquid accumulation portion 21. In the accumulator 20 according to the second embodiment, too, the liquid accumulation portion 21 is provided in a bottom portion that is positioned in a lower portion of the accumulator 20 in the gravity direction.

The small-diameter portion P1a has an inner diameter DL that is smaller than an inner diameter Du of the first channel P1 upstream of the small-diameter portion P1a and an inner diameter Dd of the first channel P1 downstream of the small-diameter portion P1a. The small-diameter pipe 34 has an inner diameter Dm that is smaller than the inner diameter DL of the small-diameter portion P1a. As the inner diameter DL of the small-diameter portion P1a is smaller than the inner diameter Du of the upstream first channel P1 and the inner diameter Dd of the first channel P1 downstream of the small-diameter portion P1a, the flow velocity of the mixture refrigerant in the small-diameter portion P1a is higher than the flow velocities of the mixture refrigerant on the upstream side and the downstream side. The pressure in the small-diameter portion P1a is lower than the pressures in the other portions of the first channel P1 due to the Venturi effect (also referred to as ejector effect) caused by such a difference in the flow velocity. By this action, the liquid non-azeotropic mixture refrigerant accumulated in the liquid accumulation portion 21 of the accumulator 20 is stably extracted through the small-diameter pipe 34.

(7) Modification

(7-1) Modification 2A

The extraction mechanism 120 according to the second embodiment may include the expansion mechanism 30 according to the first embodiment. In the extraction mechanism 120 according to the second embodiment, for example, the electric expansion valve 33 may be attached to the small-diameter pipe 34. Further, in the extraction mechanism 120 according to the second embodiment, the capillary tube 32 may be used as the small-diameter pipe 34.

(8) Feature

In the air conditioner 1 according to the second embodiment and the modification 2A, in the first channel P1, the flow velocity of the non-azeotropic mixture refrigerant in the small-diameter portion P1a is higher than the flow velocities on the upstream side and the downstream side thereof, and thus the Venturi effect occurs. Because of a reduction in the pressure of the small-diameter portion P1a due to the Venturi effect, the liquid non-azeotropic mixture refrigerant accumulated in the liquid accumulation portion 21 of the accumulator 20 is stably extracted through the small-diameter pipe 34. As a result, it is possible to prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Furthermore, the air conditioners 1 according to the second embodiment and the modification 2A are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Third Embodiment

(9) Overall Configuration

Figure 7:
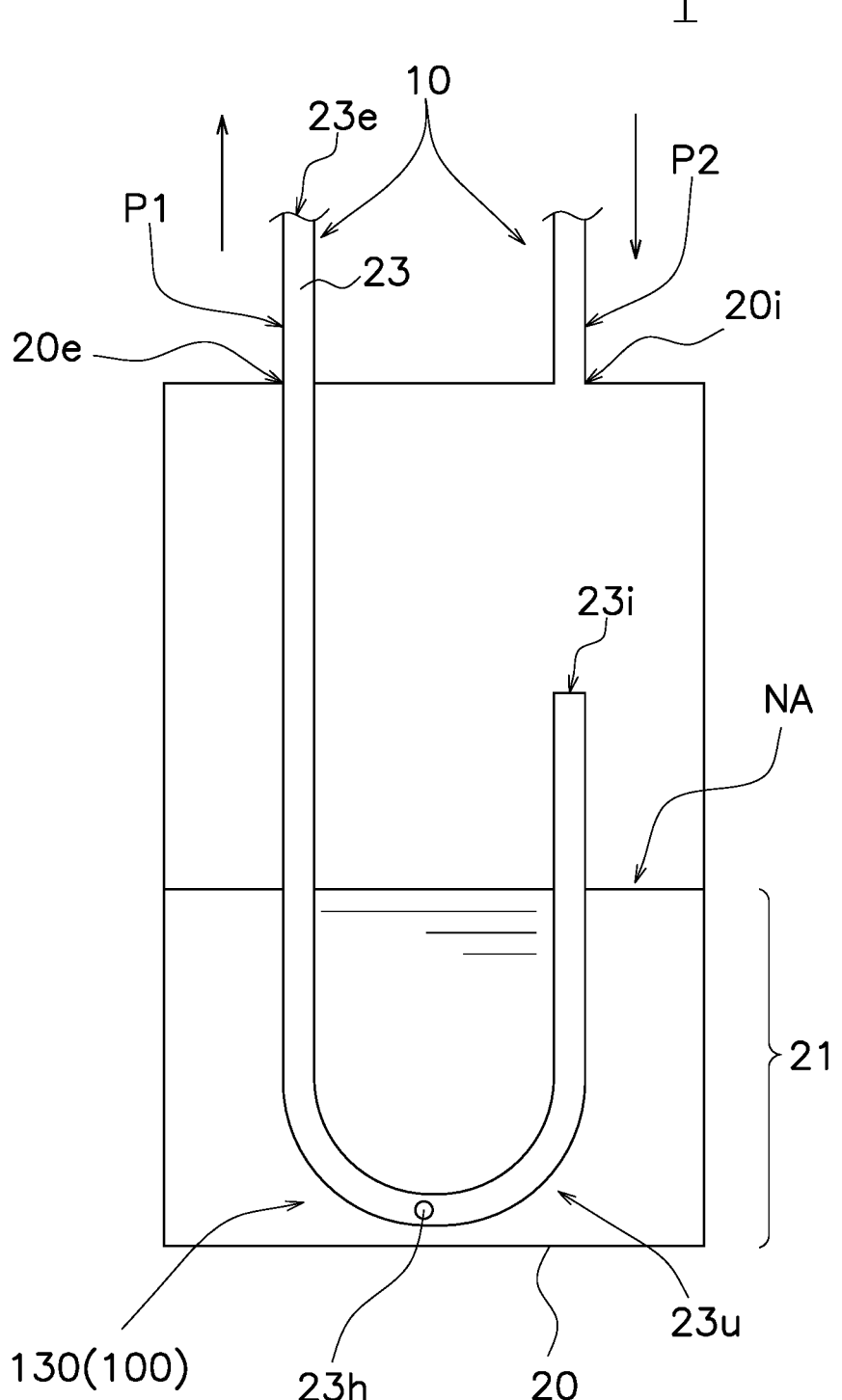
FIG. 7 is a schematic view illustrating an example of the composition adjustment mechanism according to a third embodiment.

The air conditioner 1 according to a third embodiment is different from the air conditioner 1 according to the first embodiment in the configuration of the composition adjustment mechanism 100, but is the same in the other configurations. As illustrated in FIG. 7, the composition adjustment mechanism 100 included in the air conditioner 1 according to the third embodiment includes an extraction mechanism 130 that is different from the extraction mechanism 110 according to the first embodiment. As the configuration of the air conditioner 1 according to the third embodiment other than the extraction mechanism 130 is the same as that of the air conditioner 1 according to the first embodiment, the outline of the configuration of the air conditioner 1 according to the third embodiment other than the extraction mechanism 130 is the same as the outline described in (1-2) above. Further, the operation in each mode of the air conditioner 1 according to the third embodiment is also the same as the operation described in (1-3) above. Furthermore, the non-azeotropic mixture refrigerant used in the air conditioner 1 according to the third embodiment may be the same as the non-azeotropic mixture refrigerant described in (1-1) above.

(10) Configuration and Operation of Extraction Mechanism 130

As illustrated in FIG. 7, the accumulator 20 of the air conditioner 1 according to the third embodiment includes an outlet pipe 23 that is provided on the outlet 20e of the accumulator 20 and is connected to the first channel P1. The outlet pipe 23 includes an outlet end 23e connected to the suction port 11a of the compressor 11, an inlet end 23i located inside the accumulator 20, and a U-shaped portion 23u that makes a U-turn below the inlet end 23i in the gravity direction. The extraction mechanism 130 is an opening 23h formed at a predetermined area of the U-shaped portion 23u located in the liquid accumulation portion 21. The position of the opening 23h is preferably located near the lowermost portion of the liquid accumulation portion 21. The liquid non-azeotropic mixture refrigerant accumulated in the liquid accumulation portion 21 enters the outlet pipe 23 through the opening 23h. The non-azeotropic mixture refrigerant having entered the outlet pipe 23 through the opening 23h is suctioned into the first channel P1 through the outlet pipe 23 and is extracted from the accumulator 20.

(11) Modification (11-1) Modification 3A

The extraction mechanism 130 according to the third embodiment may be combined with the extraction mechanism 110 according to the first embodiment or the extraction mechanism 120 according to the second embodiment. The extraction mechanism 130 according to the third embodiment may be configured such that, for example, the height position of the extraction area by the extraction mechanisms 110, 120 in the gravity direction may be different from the height position of the opening 23h of the extraction mechanism 130.

(11-2) Modification 3B

Figure 8A:
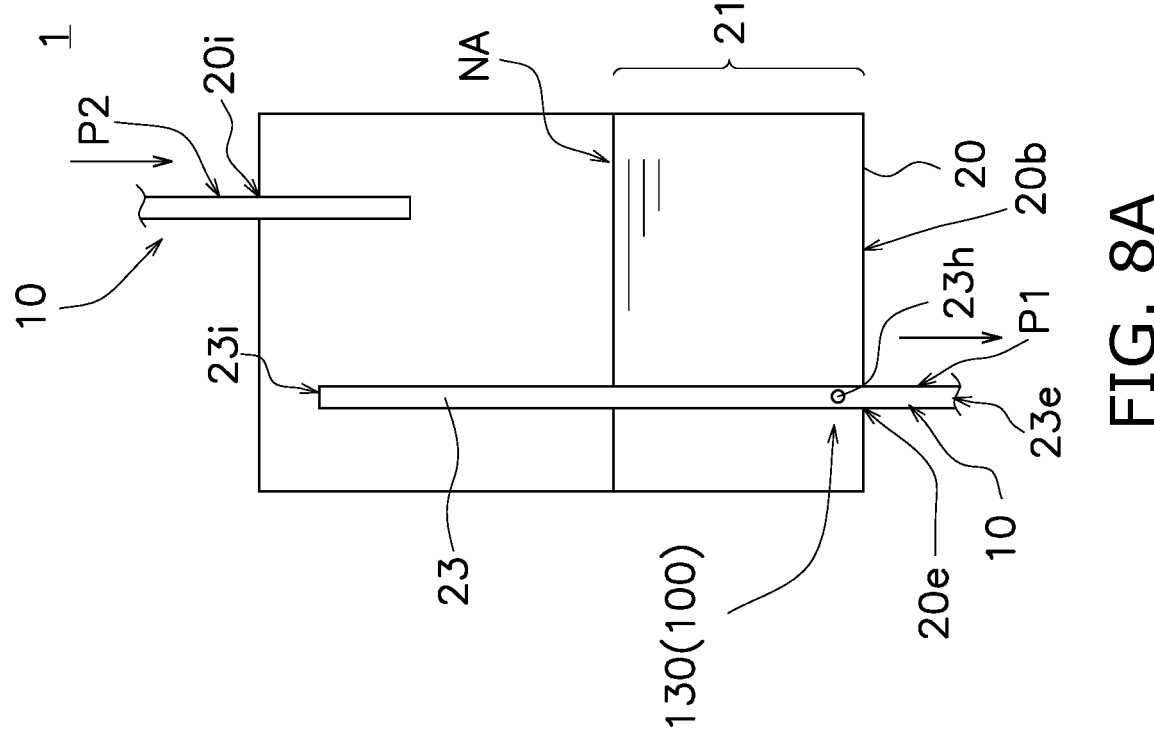
FIG. 8A is a schematic view illustrating another example of the composition adjustment mechanism according to the third embodiment.
Figure 8B:
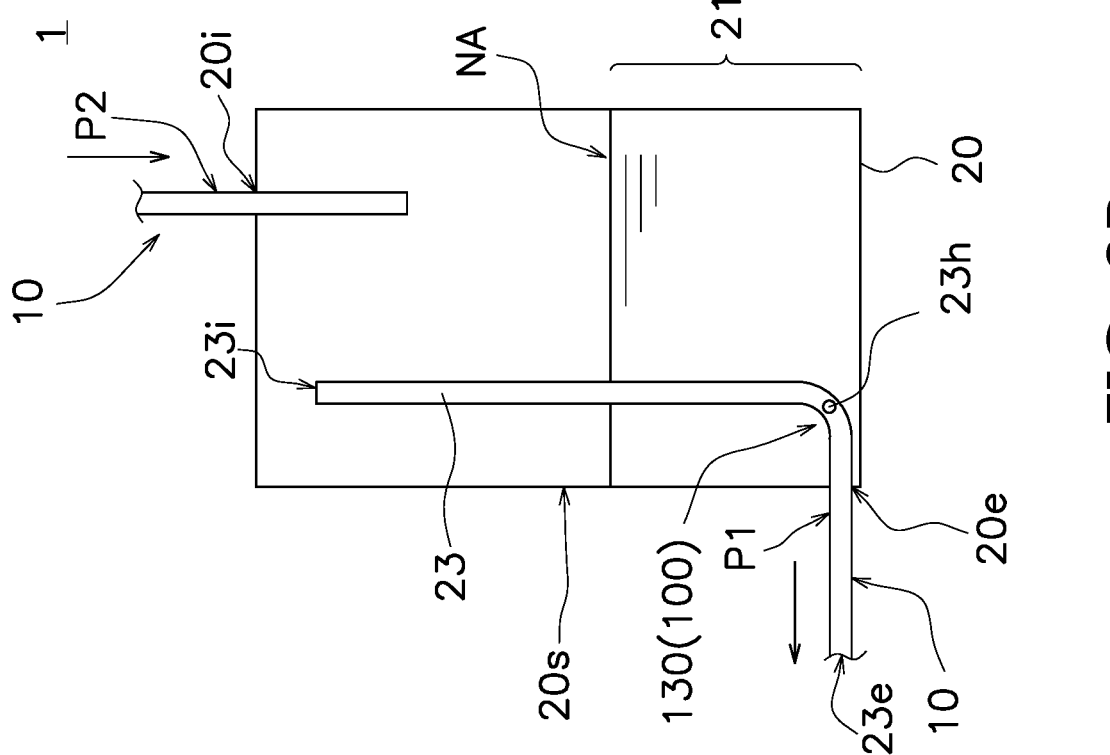
FIG. 8B is a schematic view illustrating another example of the composition adjustment mechanism according to the third embodiment.

In the case of the extraction mechanism 130 described according to the third embodiment, the opening 23h of the outlet pipe 23 is formed in the U-shaped portion 23u. However, the shape of the outlet pipe 23 is not limited to the one including the U-shaped portion 23u. For example, as illustrated in FIG. 8A, the shape of the outlet pipe 23 may be I-shaped. The I-shaped outlet pipe 23 is attached to the outlet 20e provided on a bottom surface 20b of the accumulator 20. In the outlet pipe 23, the non-azeotropic mixture refrigerant flows downward in the gravity direction from the bottom surface 20b. The extraction mechanism 130 is the opening 23h formed in the I-shaped outlet pipe 23, and the opening 23h is located in the liquid accumulation portion 21. Furthermore, as illustrated in FIG. 8B, the shape of the outlet pipe 23 may be L-shaped. The L-shaped outlet pipe 23 is attached to the outlet 20e provided on a side surface 20s of the accumulator 20. In the outlet pipe 23, the non-azeotropic mixture refrigerant flows in the horizontal direction perpendicular to the gravity direction from the side surface 20s. The extraction mechanism 130 is the opening 23h formed in the L-shaped outlet pipe 23, and the opening 23h is located in the liquid accumulation portion 21. More specifically, the opening 23h is formed at the corner of the L-shaped outlet pipe 23.

(12) Feature

In the air conditioner 1 according to the third embodiment and the modifications 3A, 3B, the opening 23h is formed at the predetermined area of the outlet pipe 23 located in the liquid accumulation portion 21. The liquid non-azeotropic mixture refrigerant may return to the first channel P1 through the opening 23h formed at the predetermined area as the mixture refrigerant circulating in the refrigerant circuit 10. Specifically, in the air conditioners 1 according to the third embodiment and the modifications 3A, 3B, the liquid non-azeotropic mixture refrigerant may be suctioned into the first channel P1 through the opening 23h in the U-shaped portion 23u of the outlet pipe 23, the I-shaped outlet pipe 23, or the L-shaped outlet pipe 23. It is possible to prevent a large amount of liquid non-azeotropic mixture refrigerant from being accumulated in the liquid accumulation portion 21 of the accumulator 20. As a result, it is possible to prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Furthermore, the air conditioners 1 according to the third embodiment and the modification 3A are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Fourth Embodiment

(13) Overall Configuration

Figure 9A:
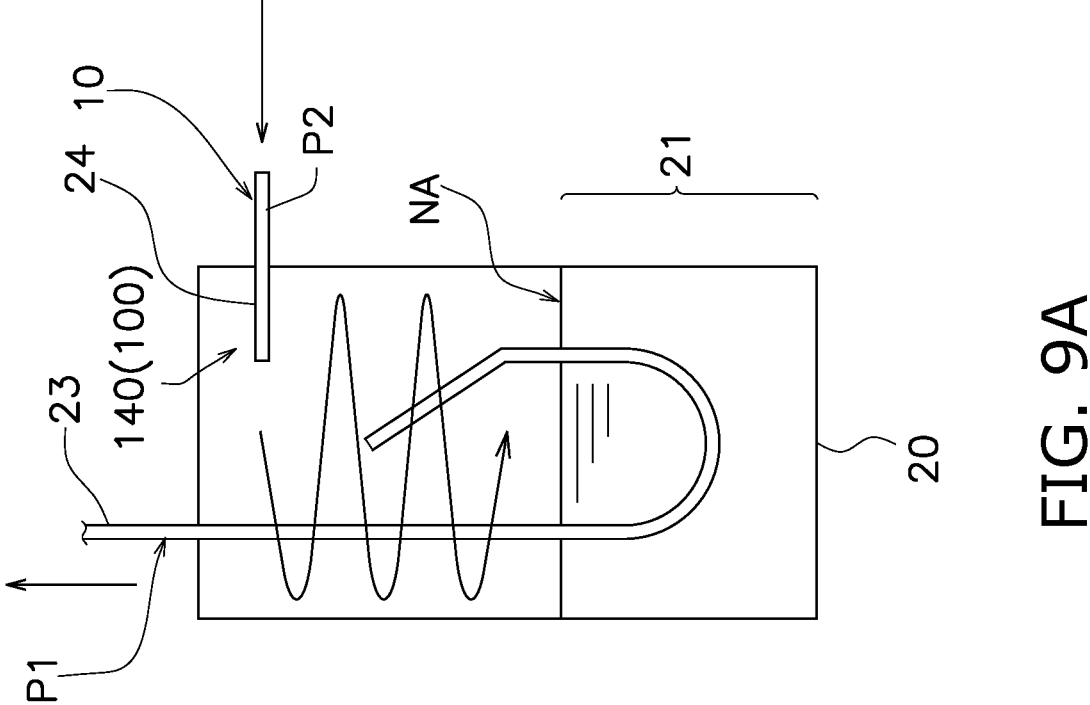
FIG. 9A is a schematic view illustrating an example of the composition adjustment mechanism according to a fourth embodiment.
Figure 9B:
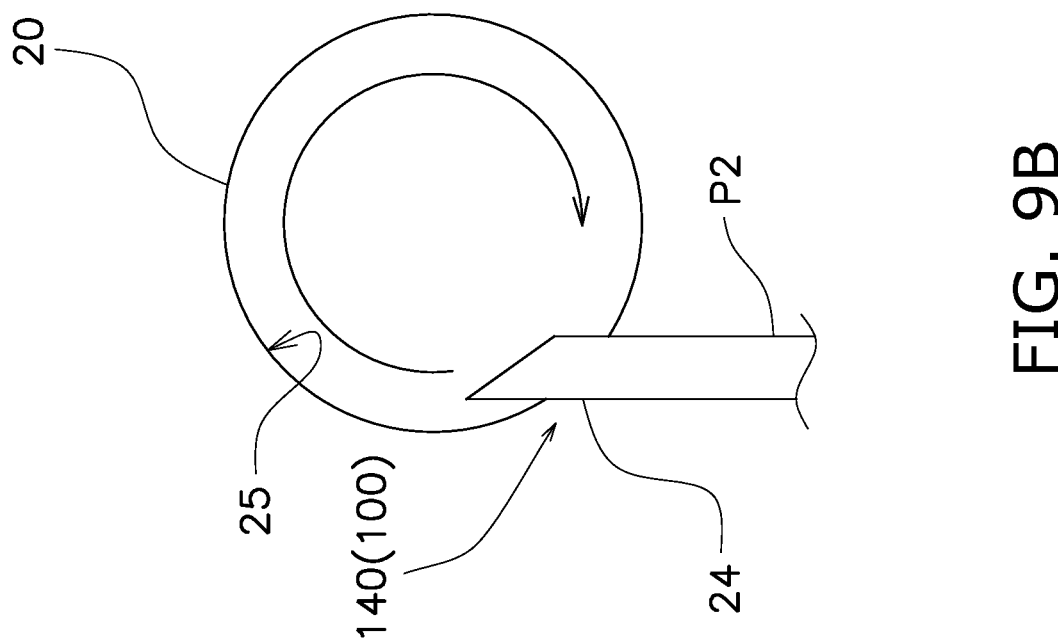
FIG. 9B is a schematic view illustrating a relationship between an inner wall and an inlet pipe of an accumulator of FIG. 9A.

The air conditioner 1 according to a fourth embodiment is different from the air conditioner 1 according to the first embodiment in the configuration of the composition adjustment mechanism 100, but is the same in the other configurations. As illustrated in FIGS. 9A and 9B, the composition adjustment mechanism 100 included in the air conditioner 1 according to the fourth embodiment includes a stirring mechanism 140 that is different from the extraction mechanism 110 according to the first embodiment. As the configuration of the air conditioner 1 according to the fourth embodiment other than the stirring mechanism 140 is the same as that of the air conditioner 1 according to the first embodiment, the outline of the configuration of the air conditioner 1 according to the fourth embodiment other than the stirring mechanism 140 is the same as the outline described in (1-2) above. Further, the operation in each mode of the air conditioner 1 according to the fourth embodiment other than the stirring mechanism 140 is also the same as the operation described in (1-3) above. Furthermore, the non-azeotropic mixture refrigerant used in the air conditioner 1 according to the fourth embodiment may be the same as the non-azeotropic mixture refrigerant described in (1-1) above.

(14) Configuration and Operation of Stirring Mechanism 140

As illustrated in FIGS. 9A and 9B, the composition adjustment mechanism 100 according to the fourth embodiment includes the stirring mechanism 140 that stirs the non-azeotropic mixture refrigerant in the accumulator 20. The accumulator 20 according to the fourth embodiment includes an inlet pipe 24 that introduces the non-azeotropic mixture refrigerant into the inside. The stirring mechanism 140 has the structure of the inlet pipe 24 provided near an inner wall 25 of the accumulator 20. The structure of the inlet pipe 24 as the stirring mechanism 140 is a structure in which the non-azeotropic mixture refrigerant is blown out in a direction intersecting the gravity direction along the inner wall 25 of the accumulator 20. More specifically, the inner wall 25 has an annular shape when viewed from above, and the blow-out direction of the inlet pipe 24 is a tangential direction of the annular inner wall 25. The non-azeotropic mixture refrigerant is blown along the inner wall 25 in a direction intersecting the gravity direction so that a swirl flow is generated in the accumulator 20. The swirl flow promotes evaporation of the liquid non-azeotropic mixture refrigerant included in the non-azeotropic mixture refrigerant blown out into the accumulator 20 from the inlet pipe 24. The mixture refrigerant blown from the inlet pipe 24 is preferably swirled as long as possible. Therefore, the inlet pipe 24 blows out air upward from the horizontal direction, for example.

With the stirring mechanism 140, the liquid mixture refrigerant entering from the inlet pipe 24 evaporates and does not accumulate in the accumulator 20. In other words, the rate of the first refrigerant included in the non-azeotropic mixture refrigerant discharged from the outlet pipe 23 of the accumulator 20 does not increase.

(15) Modification (15-1) Modification 4A

The stirring mechanism 140 according to the fourth embodiment may be combined with the extraction mechanisms 110, 120, 130 according to the first embodiment, the second embodiment, or the third embodiment.

(16) Feature

In the air conditioners 1 according to the fourth embodiment and the modification 4A, the stirring mechanism 140 has a structure in which the non-azeotropic mixture refrigerant is blown from the inlet pipe 24 along the inner wall 25 of the accumulator 20 in a direction intersecting the gravity direction. The stirring mechanism 140 may generate a swirl flow of the non-azeotropic mixture refrigerant along the inner wall of the accumulator. The swirl flow promotes the evaporation of the liquid non-azeotropic mixture refrigerant so that the liquid second refrigerant is less likely to remain in the accumulator 20. As a result, it is possible to prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Further, the air conditioners 1 according to the fourth embodiment and the modification 4A are examples of a heat pump apparatus.

Further, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Fifth Embodiment

(17) Overall Configuration

Figure 10:
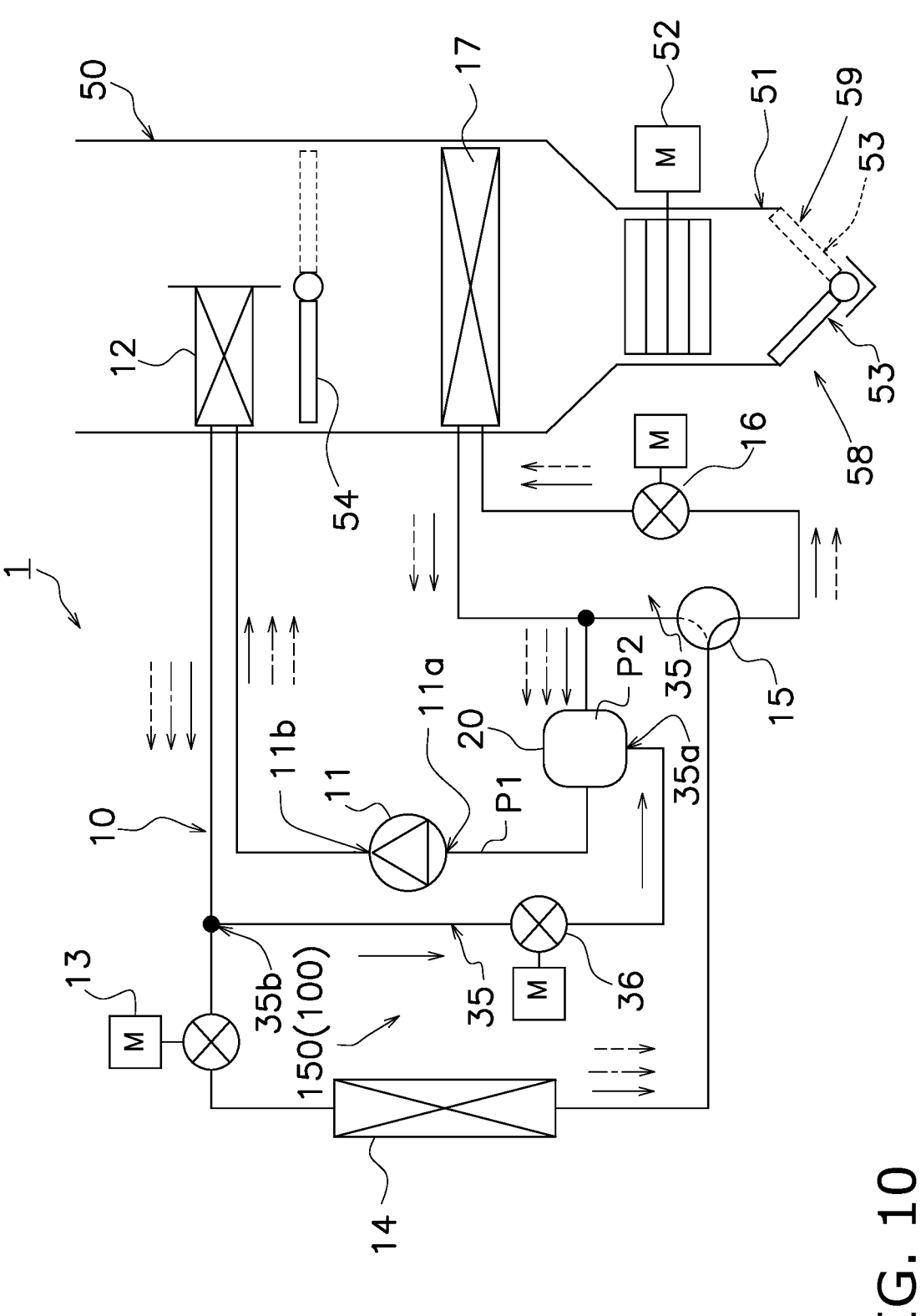
FIG. 10 is a schematic diagram illustrating an example of the configuration of the air conditioner according to a fifth embodiment.

The air conditioner 1 according to a fifth embodiment is different from the air conditioner 1 according to the first embodiment in the configuration of the composition adjustment mechanism 100, but is the same in the other configurations. As illustrated in FIG. 10, the composition adjustment mechanism 100 included in the air conditioner 1 according to the fifth embodiment includes a stirring mechanism 150 different from the extraction mechanism 110 according to the first embodiment. As the configuration of the air conditioner 1 according to the fifth embodiment other than the stirring mechanism 150 is the same as that of the air conditioner 1 according to the first embodiment, the outline of the configuration of the air conditioner 1 according to the fifth embodiment other than the stirring mechanism 150 is the same as the outline described in (1-2) above. Further, the operation in each mode of the air conditioner 1 according to the fifth embodiment other than the stirring mechanism 150 is also the same as the operation described in (1-3) above. Furthermore, the non-azeotropic mixture refrigerant used in the air conditioner 1 according to the fifth embodiment may be the same as the non-azeotropic mixture refrigerant described in (1-1) above.

(18) Configuration and Operation of Stirring Mechanism 150

Figure 11:
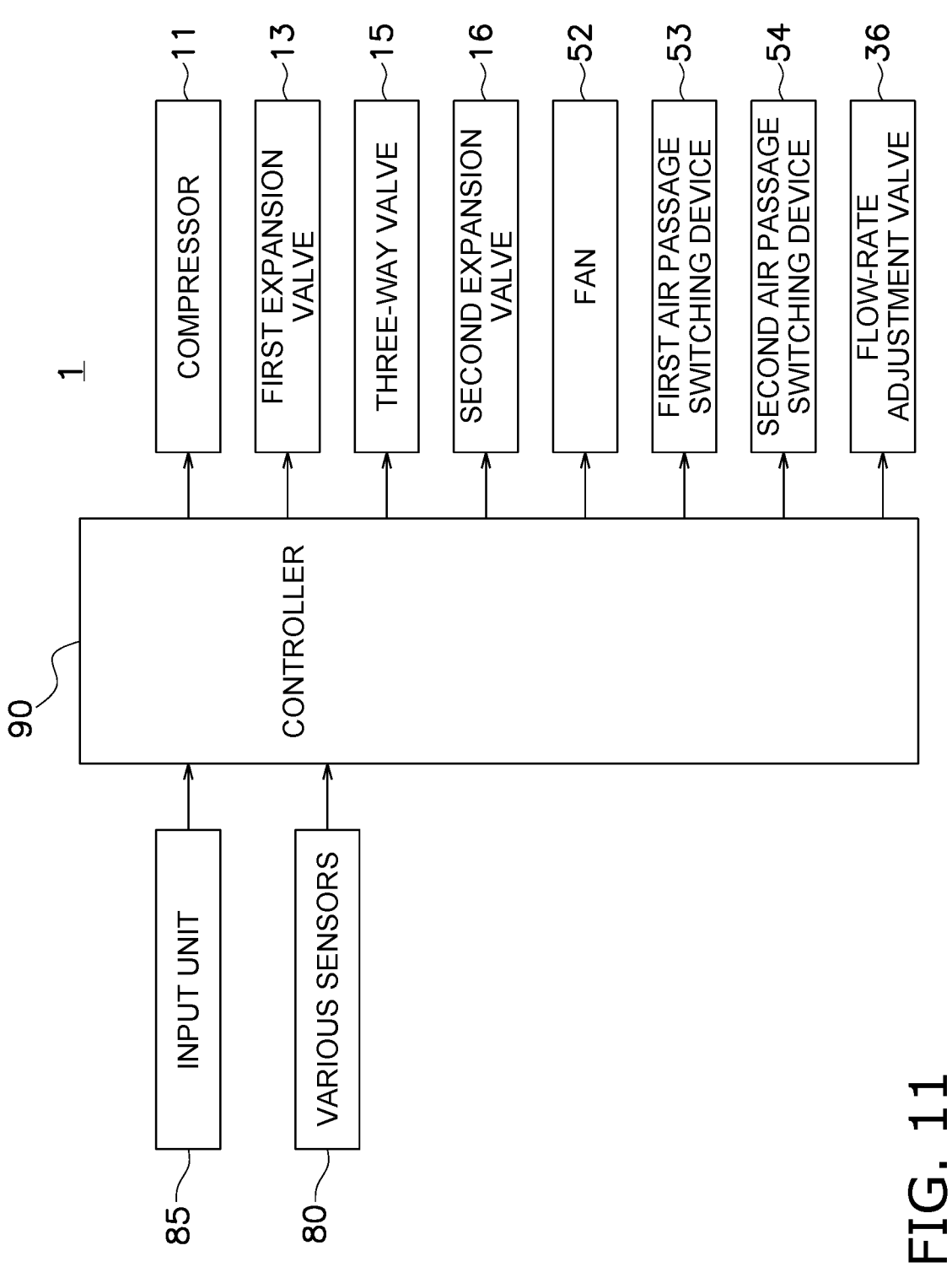
FIG. 11 is a block diagram illustrating control of the composition adjustment mechanism according to the fifth embodiment.

As illustrated in FIG. 10, the composition adjustment mechanism 100 according to the fifth embodiment includes the stirring mechanism 150 that stirs the non-azeotropic mixture refrigerant in the accumulator 20. The stirring mechanism 150 includes a refrigerant introduction channel 35 that flows the non-azeotropic mixture refrigerant into the accumulator 20. The refrigerant introduction channel 35 has a blow-out port 35a connected to the accumulator 20. The refrigerant introduction channel 35 has an intake port 35b connected to an area of the refrigerant circuit that has a pressure higher than the pressure in the accumulator Specifically, the intake port 35b is connected to a channel connecting the first heat exchanger 12 and the first expansion valve 13. The high-pressure non-azeotropic mixture refrigerant compressed by the compressor 11 flows through the channel connecting the first heat exchanger 12 and the first expansion valve 13. The blow-out port 35a of the refrigerant introduction channel 35 is preferably connected to the liquid accumulation portion 21 of the accumulator 20. Further, the blow-out port 35a is preferably connected to the bottom portion of the liquid accumulation portion 21. The refrigerant introduction channel 35 is provided with a flow-rate adjustment valve 36. When the non-azeotropic mixture refrigerant flows from the refrigerant introduction channel 35 to the accumulator 20, the mixture refrigerant may be circulated regardless of the transfer of thermal energy, which results in a reduction in the efficiency. In order to prevent such a reduction in the efficiency, for example, when the liquid non-azeotropic mixture refrigerant is accumulated in the accumulator 20, the flow-rate adjustment valve 36 is opened to introduce the high-pressure non-azeotropic mixture refrigerant into the accumulator 20. In order to introduce the high-pressure non-azeotropic mixture refrigerant at appropriate timing, the flow-rate adjustment valve 36 is controlled by the controller 90 as illustrated in FIG. 11. Alternatively, when the liquid non-azeotropic mixture refrigerant is likely to be accumulated in the accumulator 20, the flow-rate adjustment valve 36 is opened to introduce the high-pressure non-azeotropic mixture refrigerant into the accumulator 20. As illustrated in FIG. 11, the flow-rate adjustment valve 36 is controlled by the controller 90 in order to open the flow-rate adjustment valve 36 when the liquid non-azeotropic mixture refrigerant is likely to be accumulated in the accumulator 20. In order to store the appropriate timing in the controller 90, for example, information on the appropriate timing may be previously obtained by experiments or simulations using an actual machine.

By introducing the high-pressure mixture refrigerant in the refrigerant circuit 10 into the accumulator 20, the non-azeotropic mixture refrigerant is stirred in the accumulator 20. The non-azeotropic mixture refrigerant is stirred in the accumulator 20, and the liquid non-azeotropic mixture refrigerant easily evaporates. With the stirring mechanism 150 above, the liquid non-azeotropic mixture refrigerant in the accumulator 20 is evaporated and prevented from being accumulated in the accumulator 20. In other words, there is no increase in the rate of the first refrigerant included in the non-azeotropic mixture refrigerant discharged from the outlet pipe 23 of the accumulator 20.

(19) Modification (19-1) Modification 5A

The stirring mechanism 150 according to the fifth embodiment may be combined with the extraction mechanisms 110, 120, 130 according to the first embodiment, the second embodiment, or the third embodiment. Further, the stirring mechanism 150 according to the fifth embodiment may be combined with the stirring mechanism 140 according to the fourth embodiment.

(20) Feature

In the air conditioners 1 according to the fifth embodiment and the modification 5A, the non-azeotropic mixture refrigerant in the accumulator 20 is stirred by the high-pressure non-azeotropic mixture refrigerant blown out into the accumulator 20 from the refrigerant introduction channel 35. The evaporation of the liquid non-azeotropic mixture refrigerant is promoted in the accumulator 20, and the liquid second refrigerant is less likely to remain in the accumulator 20. As a result, it is possible to prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Further, the air conditioners 1 according to the fifth embodiment and the modification 5A are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant.

Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Sixth Embodiment

(21) Overall Configuration

Figure 12:
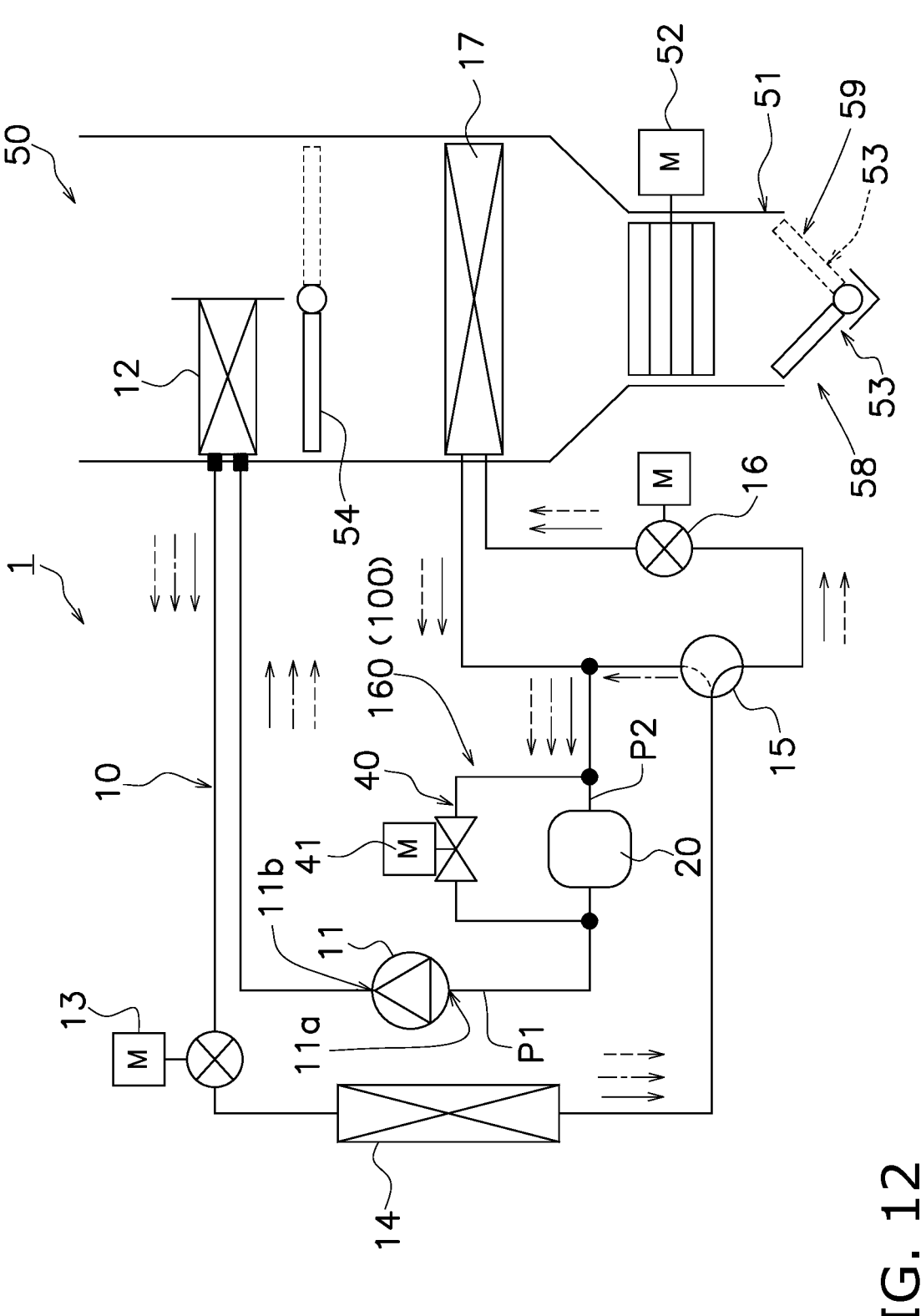
FIG. 12 is a schematic diagram illustrating an example of the configuration of the air conditioner according to a sixth embodiment.
Figure 13:
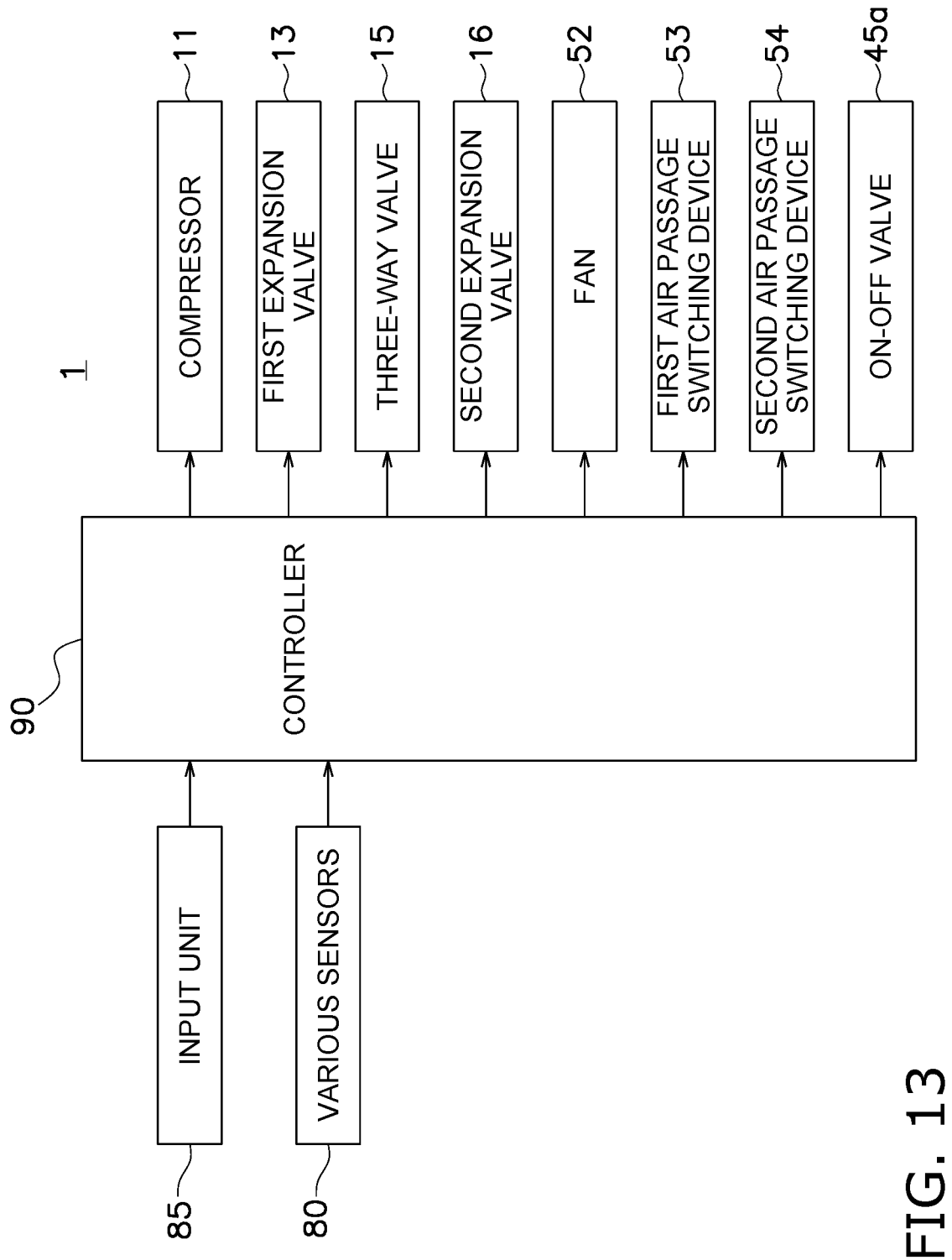
FIG. 13 is a block diagram illustrating control of the composition adjustment mechanism according to the sixth embodiment.

The air conditioner 1 according to a sixth embodiment is different from the air conditioner 1 according to the first embodiment in the configuration of the composition adjustment mechanism 100, but is the same in the other configurations. As illustrated in FIGS. 12 and 13, the composition adjustment mechanism 100 included in the air conditioner 1 according to the sixth embodiment includes a bypass portion 160 different from the extraction mechanism 110 according to the first embodiment. As the configuration of the air conditioner 1 according to the sixth embodiment other than the bypass portion 160 is the same as that of the air conditioner 1 according to the first embodiment, the outline of the configuration of the air conditioner 1 according to the sixth embodiment other than the bypass portion 160 is the same as the outline described in (1-2) above. Further, the operation in each mode of the air conditioner 1 according to the sixth embodiment other than the bypass portion 160 is also the same as the operation described in (1-3) above. Further, the non-azeotropic mixture refrigerant used in the air conditioner 1 according to the sixth embodiment may be the same as the non-azeotropic mixture refrigerant described in (1-1) above.

(22) Configuration and Operation of Bypass Portion 160

As illustrated in FIG. 12, the composition adjustment mechanism 100 according to the fifth embodiment includes the bypass portion 160 that bypasses the accumulator 20. The bypass portion 160 includes a bypass channel 40, which is connected to the first channel P1 and the second channel P2 and bypasses the accumulator 20, an on-off valve 41, which opens and closes the bypass channel 40, and the controller 90, which is a control unit that controls the on-off valve 41. The on-off valve 41 is an electric on-off valve that is opened and closed in response to a control signal from the controller 90. The controller 90 controls the on-off valve 41 to open during operation when a predetermined amount or more of liquid non-azeotropic mixture refrigerant returns to the suction port 11*a* of the compressor 11 and when the degree of wetness is smaller than a predetermined value. The above control allows the non-azeotropic mixture refrigerant including the amount of liquid non-azeotropic mixture refrigerant, which avoids damages to the compressor 11, to return to the suction port 11*a* of the compressor 11 without passing through the accumulator 20. When the on-off valve 41 is opened, the amount of liquid non-azeotropic mixture refrigerant separated by the accumulator 20 is reduced as compared with the case where the bypass portion 160 is not provided. Such an operation of the bypass portion 160 reduces the liquid non-azeotropic mixture refrigerant accumulated in the accumulator 20. In other words, there is no increase in the rate of the first refrigerant included in the non-azeotropic mixture refrigerant discharged from the accumulator 20.

Furthermore, the predetermined operation for opening and closing the on-off valve 41 and the timing for opening and closing the on-off valve 41 are, for example, determined previously by experiments using an actual machine or determined by simulations and stored in the controller 90.

(23) Modification (23-1) Modification 6A

The bypass portion 160 according to the sixth embodiment may be combined with the extraction mechanisms 110, 120, 130 according to the first embodiment, the second embodiment, or the third embodiment. Further, the bypass portion 160 according to the sixth embodiment may be combined with the stirring mechanisms 140, 150 according to the fourth embodiment or the fifth embodiment.

(23-2) Modification 6B

According to the sixth embodiment, the electrically opened and closed on-off valve 41 is used, but instead of the on-off valve 41, an electric valve may be used, which may change the opening degree.

(24) Feature

In the air conditioners 1 according to the sixth embodiment and the modifications 6A, 6B, the non-azeotropic mixture refrigerant passes through the bypass channel 40 without passing through the accumulator 20 during a predetermined operation as a result of control by the controller 90 which is a control unit. The predetermined operation is an operation in which the rate of the first refrigerant included in the non-azeotropic mixture refrigerant flowing out from the accumulator 20 to the first channel P1 increases when the non-azeotropic mixture refrigerant passes through the accumulator 20 without passing through the bypass channel 40. During the predetermined operation, the bypass channel 40 allows the non-azeotropic mixture refrigerant to flow from the second channel P2 to the first channel P1 without passing through the accumulator 20, thereby preventing the second refrigerant from being accumulated in the accumulator 20 during the predetermined operation. Thus, an increase in the rate of the first refrigerant included in the non-azeotropic mixture refrigerant discharged from the compressor may be prevented. As a result, it is possible to prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Further, the air conditioners 1 according to the sixth embodiment and the modifications 6A, 6B are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Seventh Embodiment

(25) Overall Configuration

Figure 14:
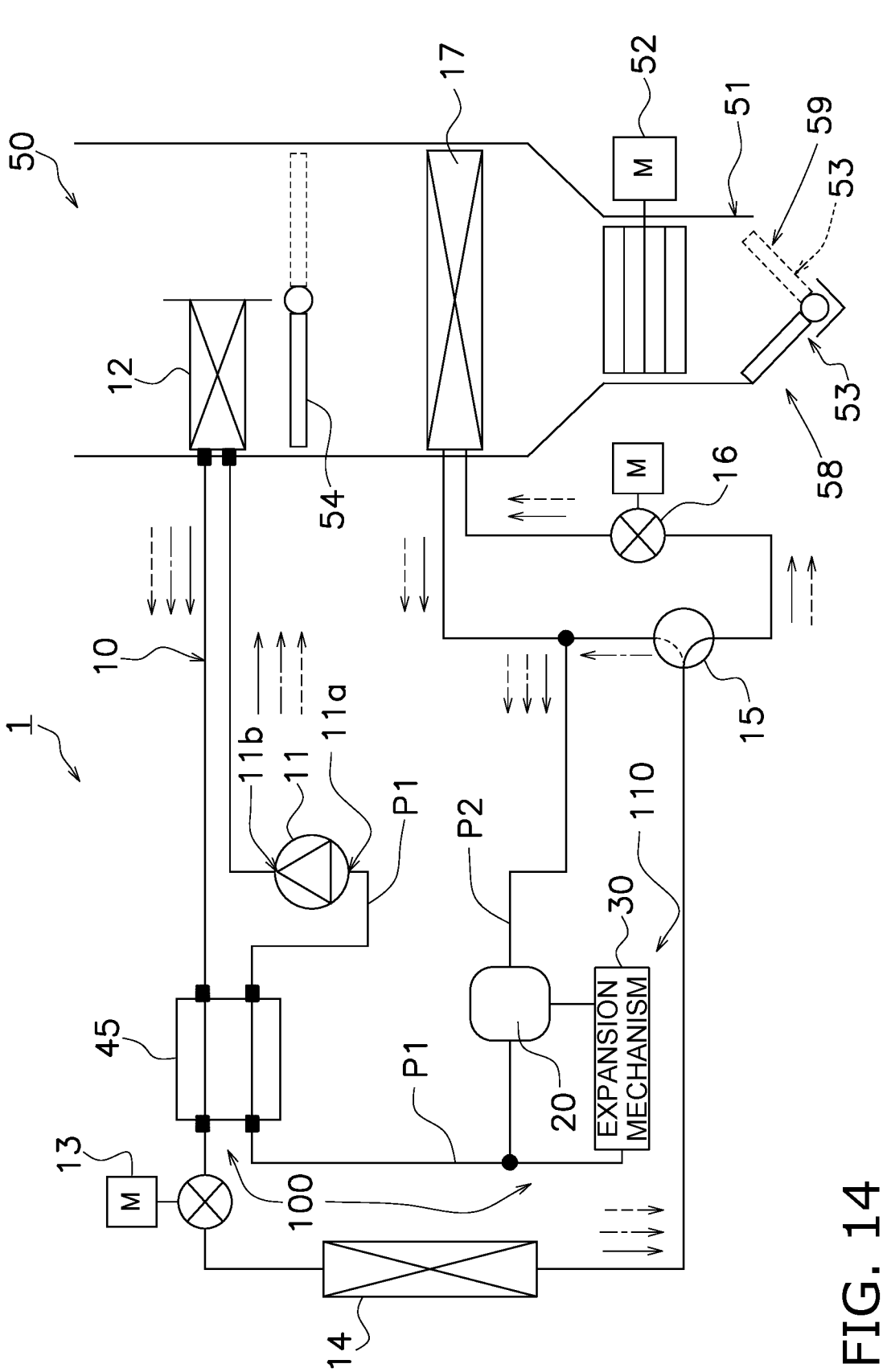
FIG. 14 is a schematic diagram illustrating an example of the configuration of the air conditioner according to a seventh embodiment.

The air conditioner 1 according to a seventh embodiment is different from the air conditioner 1 according to the first embodiment in the configuration of the composition adjustment mechanism 100, but is the same in the other configurations. As illustrated in FIG. 14, the composition adjustment mechanism 100 included in the air conditioner 1 according to the seventh embodiment includes an internal heat exchanger 45 together with the extraction mechanism 110 according to the first embodiment. As the configuration of the air conditioner 1 according to the seventh embodiment other than the internal heat exchanger 45 is the same as that of the air conditioner 1 according to the first embodiment, the outline of the configuration of the air conditioner 1 according to the seventh embodiment other than the internal heat exchanger 45 is the same as the outline described in (1-2) above. Further, the operation in each mode of the air conditioner 1 according to the seventh embodiment other than the part of the internal heat exchanger 45 is also the same as the operation described in (1-3) above. Further, the non-azeotropic mixture refrigerant used in the air conditioner 1 according to the seventh embodiment may be the same as the non-azeotropic mixture refrigerant described in (1-1) above.

(26) Configuration and Operation of Internal Heat Exchanger 45

As illustrated in FIG. 14, the composition adjustment mechanism 100 according to the seventh embodiment includes the internal heat exchanger 45 that exchanges heat with the non-azeotropic mixture refrigerant flowing through the first channel P1 to heat the non-azeotropic mixture refrigerant. Here, the internal heat exchanger 45 exchanges heat between the non-azeotropic mixture refrigerant flowing from the first heat exchanger 12 to the first expansion valve 13 and the non-azeotropic mixture refrigerant flowing through the first channel P1. After the liquid non-azeotropic mixture refrigerant in the accumulator 20 is merged into the first channel P1, the non-azeotropic mixture refrigerant flowing through the first channel P1 is heated so that the degree of superheating of the mixture refrigerant suctioned into the compressor 11 may be increased. By increasing the degree of superheating after the liquid non-azeotropic mixture refrigerant is merged into the first channel P1, the liquid non-azeotropic mixture refrigerant is vaporized, and it is possible to prevent a large amount of liquid refrigerant from being suctioned into the compressor 11. By this effect, it is possible to return a larger amount of liquid non-azeotropic mixture refrigerant from the accumulator 20 to the first channel P1, as compared with the case where the internal heat exchanger 45 is not provided. By providing the internal heat exchanger 45, the liquid non-azeotropic mixture refrigerant in the accumulator 20 may be easily reduced. In other words, as compared with the air conditioner 1 according to the first embodiment, the air conditioner 1 according to the second embodiment is more likely to prevent an increase in the rate of the first refrigerant included in the non-azeotropic mixture refrigerant discharged from the outlet 20e of the accumulator 20.

(27) Modification (27-1) Modification 7A

In the case described for the composition adjustment mechanism 100 according to the seventh embodiment, the extraction mechanism 110 and the internal heat exchanger 45 are provided. However, the extraction mechanism provided together with the internal heat exchanger 45 is not limited to the extraction mechanism 110 according to the first embodiment. The composition adjustment mechanism 100 according to the seventh embodiment may be configured by combining the extraction mechanism 120, 130 according to the second embodiment or the third embodiment and the internal heat exchanger 45. Further, the composition adjustment mechanism 100 according to the seventh embodiment may be a combination of the stirring mechanisms 140, 150 according to the fourth embodiment or the fifth embodiment and the internal heat exchanger 45. Furthermore, the composition adjustment mechanism 100 according to the seventh embodiment may be configured by incorporating the internal heat exchanger 45 into the composition adjustment mechanism 100 according to the sixth embodiment.

(28) Feature

In the air conditioners 1 according to the seventh embodiment and the modification 7A, the non-azeotropic mixture refrigerant flowing through the first channel P1 is heated in the internal heat exchanger 45, and thus at least part of the liquid non-azeotropic mixture refrigerant flowing through the first channel P1 is vaporized. When at least part of the liquid non-azeotropic mixture refrigerant is vaporized, the rate of the liquid non-azeotropic mixture refrigerant suctioned into the compressor 11 is reduced so that it is possible to reduce the risk that the compressor 11 gets damaged due to a large amount of liquid non-azeotropic mixture refrigerant suctioned. Therefore, as compared with the case where the internal heat exchanger is not provided, a larger amount of liquid non-azeotropic mixture refrigerant may flow from the accumulator 20 to the first channel P1, and the liquid second refrigerant is less likely to remain in the accumulator 20. As a result, it is possible to prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Further, the air conditioners 1 according to the seventh embodiment and the modification 7A are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Eighth Embodiment

(29) Overall Configuration

Figure 15:
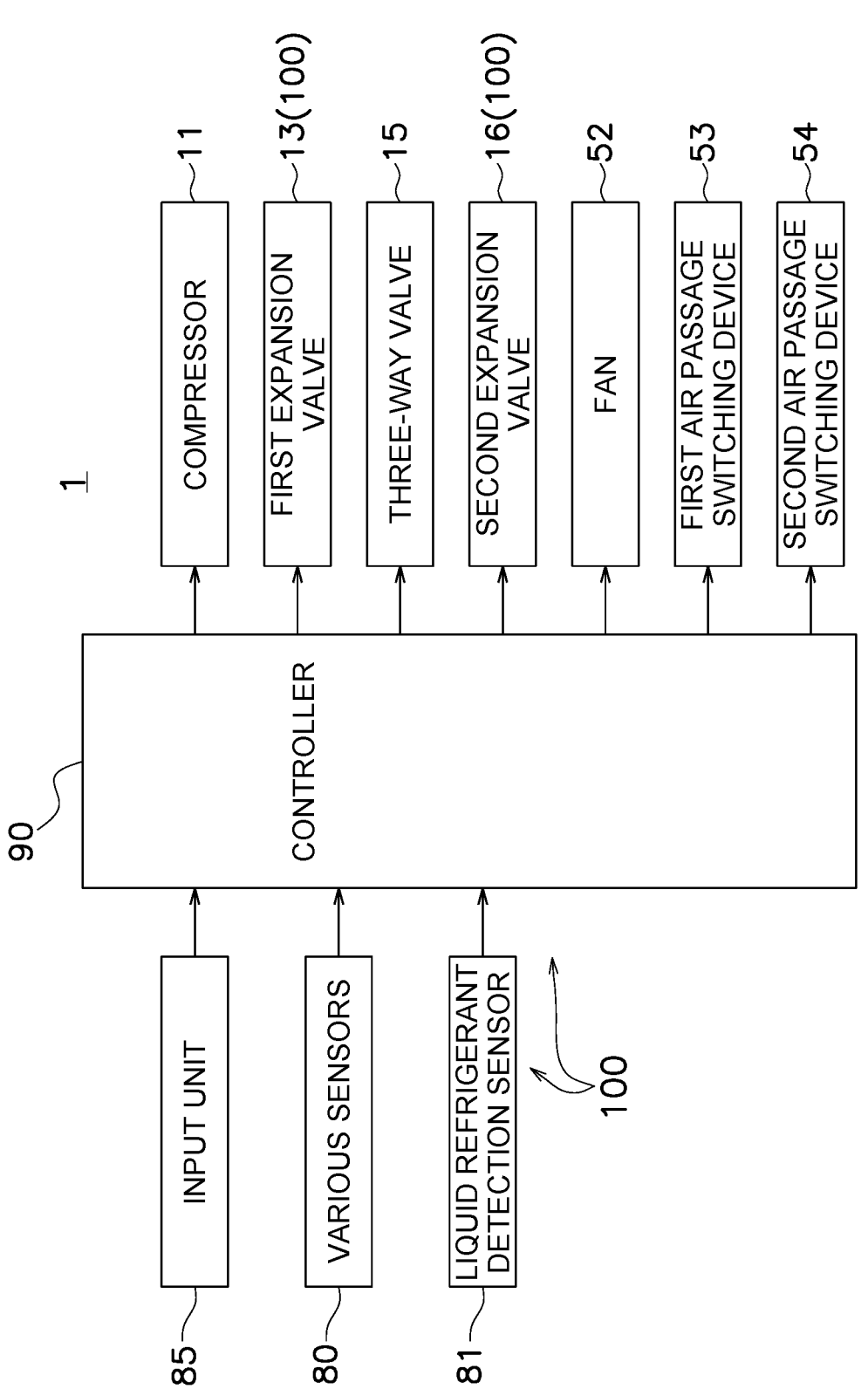
FIG. 15 is a block diagram illustrating an example of the composition adjustment mechanism according to an eighth embodiment.

The air conditioner 1 according to an eighth embodiment is different from the air conditioner 1 according to the first embodiment in the configuration of the composition adjustment mechanism 100, but is the same in the other configurations. As illustrated in FIG. 15, the composition adjustment mechanism 100 included in the air conditioner 1 according to the eighth embodiment includes a liquid refrigerant detection sensor 81 that detects the liquid non-azeotropic mixture refrigerant accumulated in the accumulator 20. As the configuration of the air conditioner 1 according to the eighth embodiment other than the liquid refrigerant detection sensor 81 is the same as the air conditioner 1 according to the first embodiment, the outline of the configuration of the air conditioner 1 according to the eighth embodiment other than the configuration related to the liquid refrigerant detection sensor 81 is the same as the outline described in (1-2) above. Further, the operation in each mode of the air conditioner 1 according to the eighth embodiment other than the part relating to the liquid refrigerant detection sensor 81 is also the same as the operation described in (1-3) above. Furthermore, the non-azeotropic mixture refrigerant used in the air conditioner 1 according to the eighth embodiment may be the same as the non-azeotropic mixture refrigerant described in (1-1) above.

(30) Configuration and Operation related to Liquid Refrigerant Detection Sensor 81

The composition adjustment mechanism 100 according to the eighth embodiment includes a control unit that has a predetermined mode to control a device related to the non-azeotropic mixture refrigerant in the refrigerant circuit 10 (see FIG. 1) and increase the suction superheat at the suction port 11a (see FIG. 1) of the compressor 11. More specifically, as illustrated in FIG. 14, the composition adjustment mechanism 100 according to the eighth embodiment includes the controller 90 as a control unit, the liquid refrigerant detection sensor 81, the first expansion valve 13, and the second expansion valve 16. In the composition adjustment mechanism 100 according to the eighth embodiment, the controller 90 shifts to the predetermined mode when the liquid refrigerant detection sensor 81 detects that the liquid non-azeotropic mixture refrigerant is accumulated in the accumulator 20. When shifting to the predetermined mode, the controller 90 performs control to increase the suction superheat at the suction port 11 a of the compressor 11 as compared with the one before the shift. When shifting to the predetermined mode, the controller 90 decreases the opening degree of the first expansion valve 13 to decrease the flow rate of the mixture refrigerant flowing through the second heat exchanger 14 in the heating mode, thereby increasing the suction superheat at the suction port 11 a of the compressor 11. When shifting to the predetermined mode, the controller reduces the opening degree of the second expansion valve 16 to reduce the flow rate of the mixture refrigerant flowing through the third heat exchanger 17 in the cooling mode and the dehumidification heating mode, thereby increasing the suction superheat at the suction port 11 a of the compressor 11.

When the controller 90 shifts to the predetermined mode to increase the suction superheat of the compressor 11, the liquid non-azeotropic mixture refrigerant entering the accumulator 20 may be reduced as compared with that before the shift to the predetermined mode. Alternatively, when the controller 90 shifts to the predetermined mode to increase the suction superheat of the compressor 11, the liquid non-azeotropic mixture refrigerant accumulated in the accumulator 20 may be reduced as compared with that before the shift to the predetermined mode.

(31) Modification (31-1) Modification 8A

The composition adjustment mechanism 100 according to the eighth embodiment may be configured in combination with the extraction mechanisms 110, 120, 130 according to the first embodiment, the second embodiment, or the third embodiment. Further, the composition adjustment mechanism 100 according to the eighth embodiment may be combined with the stirring mechanisms 140, 150 according to the fourth embodiment or the fifth embodiment. Further, the composition adjustment mechanism 100 according to the eighth embodiment may be combined with the composition adjustment mechanism 100 according to the sixth embodiment or the composition adjustment mechanism 100 according to the seventh embodiment.

(31-2) Modification 8B

In the composition adjustment mechanism 100 according to the eighth embodiment, the controller 90 determines the timing to shift to the predetermined mode by the liquid refrigerant detection sensor 81, but the timing to shift to the predetermined mode may be determined by a method other than the method using the liquid refrigerant detection sensor 81. For example, the configuration may be such that the timing to shift to the predetermined mode is determined using the various sensors 80 used in conventional air conditioners other than the liquid refrigerant detection sensor 81 by previously conducting experiments with an actual machine, and the liquid refrigerant detection sensor 81 may be omitted.

(32) Feature

In the air conditioners 1 according to the eighth embodiment and the modifications 8A, 8B, when the liquid non-azeotropic mixture refrigerant is accumulated in the accumulator 20, the controller 90, which is a control unit, shifts to the predetermined mode. When the controller shifts to the predetermined mode, the suction superheat at the suction port 11*a* of the compressor 11 may be increased. When the suction superheat increases, the liquid non-azeotropic mixture refrigerant is less likely to be accumulated in the accumulator 20, and the air conditioner 1 may prevent an increase in the rate of the first refrigerant included in the non-azeotropic mixture refrigerant discharged from the compressor 11. In this way, by preventing an increase in the rate of the first refrigerant included in the non-azeotropic mixture refrigerant discharged from the compressor 11, it is possible to prevent an increase in the risk of disproportionation reaction. Further, the air conditioners 1 according to the eighth embodiment and the modifications 8A, 8B are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Ninth Embodiment

(33) Overall Configuration

Figure 16:
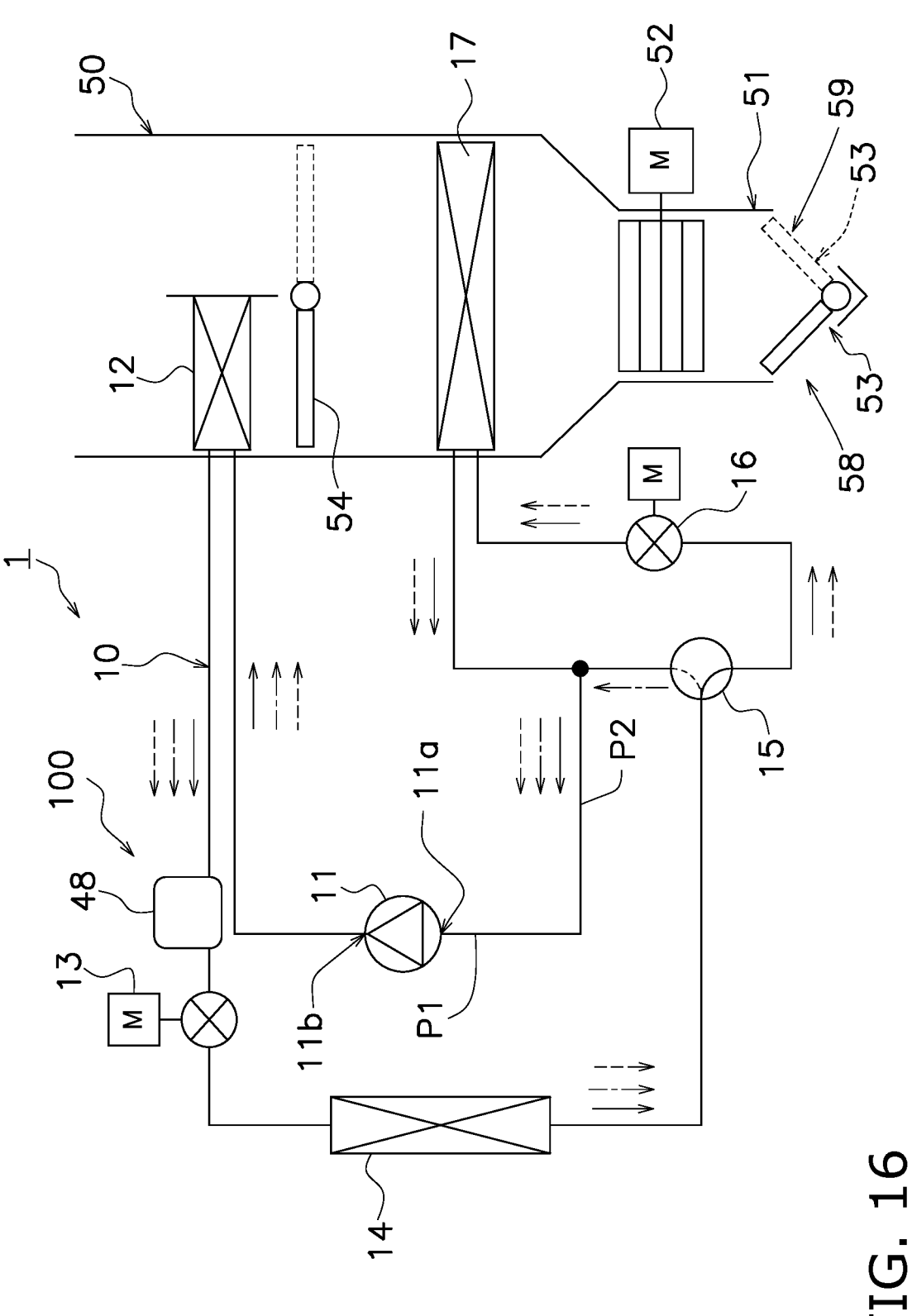
FIG. 16 is a schematic diagram illustrating an example of the configuration of the air conditioner according to a ninth embodiment.

FIG. 16 illustrates an example of the configuration of the air conditioner 1 according to a ninth embodiment. As can be seen by comparing FIG. 1 and FIG. 16, the air conditioner 1 according to the ninth embodiment is different from the air conditioner 1 according to the first embodiment in that a receiver 48 is provided instead of the accumulator 20, but is the same in the other configurations. In other words, the configuration of the air conditioner 1 according to the ninth embodiment is a configuration in which the accumulator 20 is removed from the configuration of the air conditioner 1 according to the first embodiment and the receiver 48 is attached.

As the configuration of the air conditioner 1 according to the ninth embodiment other than the receiver 48 is the same as the configuration of the air conditioner 1 according to the first embodiment other than the accumulator 20, the outline of the configuration of the air conditioner 1 according to the ninth embodiment other than the receiver 48 is the same as the outline described in (1-2) above other than the accumulator 20. For example, the three-way valve 15 switches between the state of connecting the second heat exchanger 14 and the suction port 11*a* of the compressor 11 and the state of connecting the second heat exchanger 14 and the second expansion valve 16. When the three-way valve 15 is in the state of connecting the second heat exchanger 14 and the suction port 11*a* of the compressor 11, the second expansion valve 16 is closed, and the mixture refrigerant does not flow from the three-way valve 15 to the suction port 11*a* of the compressor 11 via the second expansion valve 16 and the third heat exchanger 17. When the three-way valve 15 is in the state of connecting the second heat exchanger 14 and the second expansion valve 16, the mixture refrigerant flows from the three-way valve 15 to the suction port 11*a* of the compressor 11 via the second expansion valve 16 and the third heat exchanger 17. Furthermore, the mixture refrigerant flowing out of the first heat exchanger 12 flows into the first expansion valve 13 via the receiver 48.

Further, the operation in each mode of the air conditioner 1 according to the ninth embodiment other than the receiver 48 is also the same as the operation described in (1-3) above other than the accumulator 20. For example, in the first channel of the heating mode, the mixture refrigerant flows through the compressor 11, the first heat exchanger 12, the receiver 48, the first expansion valve 13, the second heat exchanger 14, the three-way valve 15, and the compressor 11 in this order.

In the second channel of the cooling mode and the dehumidification heating mode, the mixture refrigerant flows through the compressor 11, the first heat exchanger 12, the receiver 48, the first expansion valve 13, the second heat exchanger 14, the three-way valve 15, the second expansion valve 16, the third heat exchanger 17, and the compressor 11 in this order.

In the first channel through which the mixture refrigerant passes in the heating mode, the gaseous mixture refrigerant is suctioned from the suction port of the compressor 11 and is compressed. The gaseous mixture refrigerant compressed by the compressor 11 is discharged from the discharge port 11*b* of the compressor 11. The mixture refrigerant discharged from the discharge port 11*b* of the compressor 11 is sent to the first heat exchanger 12. In the heating mode, the mixture refrigerant exchanges heat with the air blown out into the inside of the cabin in the first heat exchanger 12. The mixture refrigerant after heat exchange in the first heat exchanger 12 enters the receiver 48, and the excess refrigerant is accumulated in the receiver 48. The refrigerant flowing out of the receiver 48 is decompressed by the first expansion valve 13. The mixture refrigerant after decompression by the first expansion valve 13 exchanges heat with the air outside the vehicle in the second heat exchanger 14. The mixture refrigerant after heat exchange in the second heat exchanger 14 is suctioned into the compressor 11 via the three-way valve 15.

In the second channel through which the mixture refrigerant passes in the cooling mode, the gaseous mixture refrigerant is suctioned from the suction port of the compressor 11 and is compressed. The gaseous mixture refrigerant compressed by the compressor 11 is discharged from the discharge port 11 b of the compressor 11. The mixture refrigerant discharged from the discharge port 11*b* of the compressor 11 is sent to the first heat exchanger 12. In the cooling mode, the mixture refrigerant does not exchange heat in the first heat exchanger 12. The mixture refrigerant having passed through the first heat exchanger 12 enters the receiver 48, and the excess refrigerant is accumulated in the receiver 48. The refrigerant flowing out of the receiver 48 passes through the first expansion valve 13 in a fully opened state. The mixture refrigerant having passed through the first expansion valve 13 without being decompressed exchanges heat with the air outside the vehicle in the second heat exchanger 14. The mixture refrigerant after heat exchange in the second heat exchanger 14 is decompressed by the second expansion valve 16 via the three-way valve 15. The mixture refrigerant decompressed by the second expansion valve 16 exchanges heat with the air blown out into the inside of the cabin in the third heat exchanger 17. The mixture refrigerant after heat exchange in the third heat exchanger 17 is suctioned into the compressor 11.

Further, the non-azeotropic mixture refrigerant used in the air conditioner 1 according to the ninth embodiment may be the same as the non-azeotropic mixture refrigerant described in (1-1) above.

(34) Configuration and Operation of Receiver 48

The composition adjustment mechanism 100 according to the ninth embodiment is the receiver 48. The receiver 48 is provided in a high-pressure portion of the refrigerant circuit 10 that has a pressure higher than the suction port 11 a of the compressor 11. According to the ninth embodiment, the receiver 48 is provided between the first heat exchanger 12 and the first expansion valve 13. The receiver 48 has a function to pass the first refrigerant and the second refrigerant in the non-azeotropic mixture refrigerant without changing the rate thereof. In the heating mode or the dehumidification heating mode, for example, the liquid non-azeotropic mixture refrigerant entering the receiver 48, the liquid non-azeotropic mixture refrigerant accumulated in the receiver 48, and the liquid non-azeotropic mixture refrigerant flowing out of the receiver 48 have the identical rates of the first refrigerant and the second refrigerant. Furthermore, the air conditioner 1 according to the ninth embodiment does not include the accumulator 20. In this case, even when the excess liquid non-azeotropic mixture refrigerant is accumulated in the receiver 48, the ratio between the first refrigerant and the second refrigerant in the mixture refrigerant circulating in the refrigerant circuit 10 does not change. Further, even when the ratio between the first refrigerant and the second refrigerant in the mixture refrigerant accumulated in the receiver 48 is slightly changed as compared with the mixture refrigerant flowing in and out of the receiver 48, the effect on the composition of the mixture refrigerant circulating in the refrigerant circuit 10 is sufficiently small as compared with the case where the liquid non-azeotropic mixture refrigerant is accumulated in the accumulator 20.

(35) Modification (35-1) Modification 9A

In the described case, the accumulator 20 is removed from the air conditioner 1 according to the ninth embodiment, but instead of removing the accumulator 20, the composition adjustment mechanism 100 according to the ninth embodiment including the receiver 48 may be configured in combination with the extraction mechanisms 110, 120, 130 according to the first embodiment, the second embodiment, or the third embodiment. The composition adjustment mechanism 100 according to the ninth embodiment may be combined with the stirring mechanisms 140, 150 according to the fourth embodiment or the fifth embodiment. Further, the composition adjustment mechanism 100 according to the ninth embodiment may be combined with the composition adjustment mechanism 100 according to the sixth embodiment or the composition adjustment mechanism 100 according to the seventh embodiment. Further, the composition adjustment mechanism 100 according to the ninth embodiment may be combined with the composition adjustment mechanism 100 according to the eighth embodiment.

(35-2) Modification 9B

Figure 17:
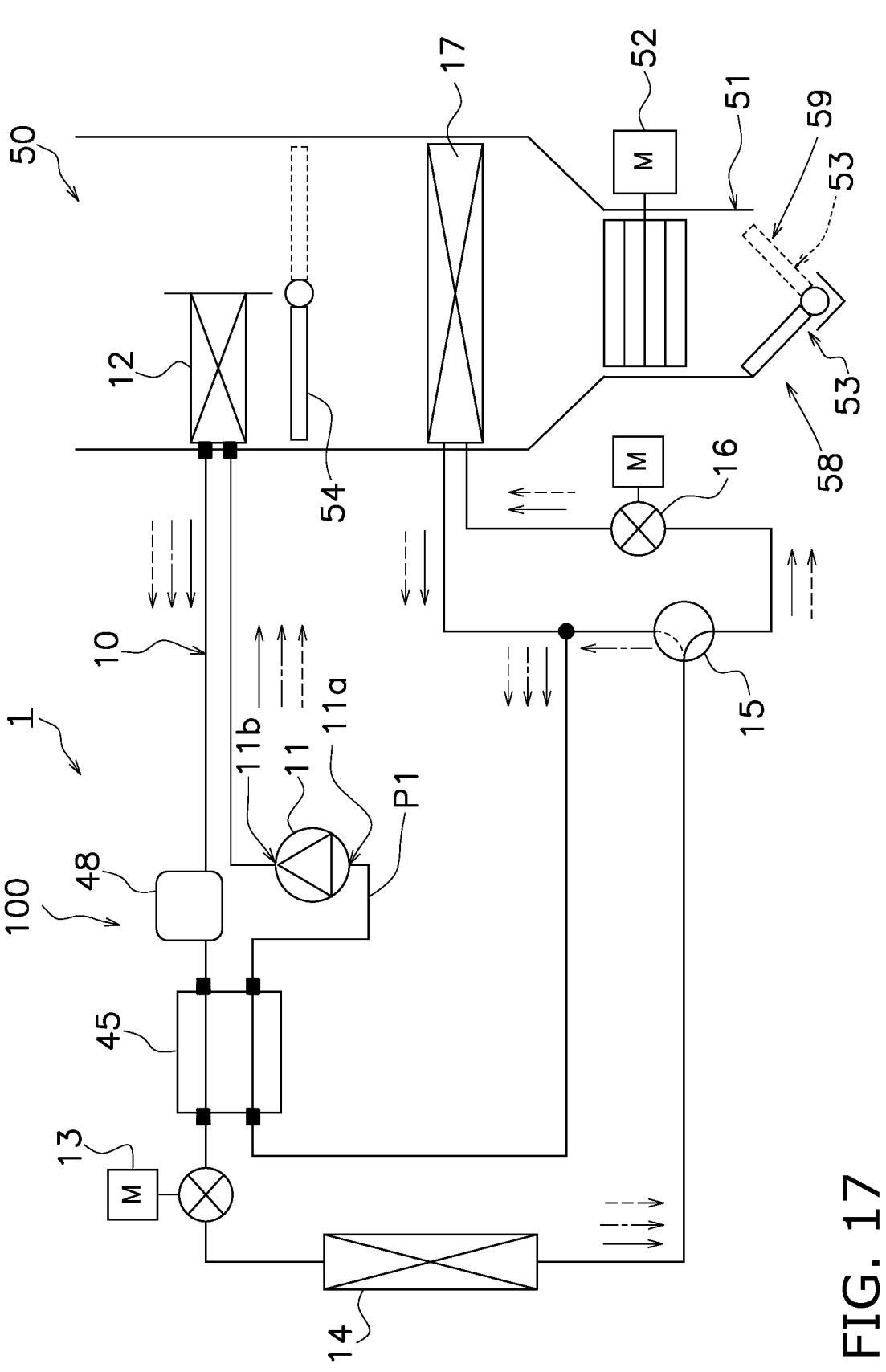
FIG. 17 is a schematic diagram illustrating another example of the configuration of the air conditioner according to the ninth embodiment.

As illustrated in FIG. 17, the composition adjustment mechanism 100 according to the ninth embodiment may be configured to include the internal heat exchanger 45. As illustrated in FIG. 17, the composition adjustment mechanism 100 according to a modification 9B of the ninth embodiment heats the non-azeotropic mixture refrigerant by exchanging heat with the non-azeotropic mixture refrigerant suctioned from the suction port 11a of the compressor 11 by the internal heat exchanger 45. Here, the internal heat exchanger 45 exchanges heat between the non-azeotropic mixture refrigerant flowing from the receiver 48 to the first expansion valve 13 and the non-azeotropic mixture refrigerant before flowing into the suction port 11a of the compressor 11. By heating the non-azeotropic mixture refrigerant before flowing into the suction port 11a of the compressor 11, the degree of superheating of the mixture refrigerant suctioned into the compressor 11 may be increased. By increasing the degree of superheating, the liquid non-azeotropic mixture refrigerant is vaporized, and it is possible to prevent a large amount of liquid refrigerant from being suctioned into the compressor 11.

(35-3) Modification 9C

Figure 18:
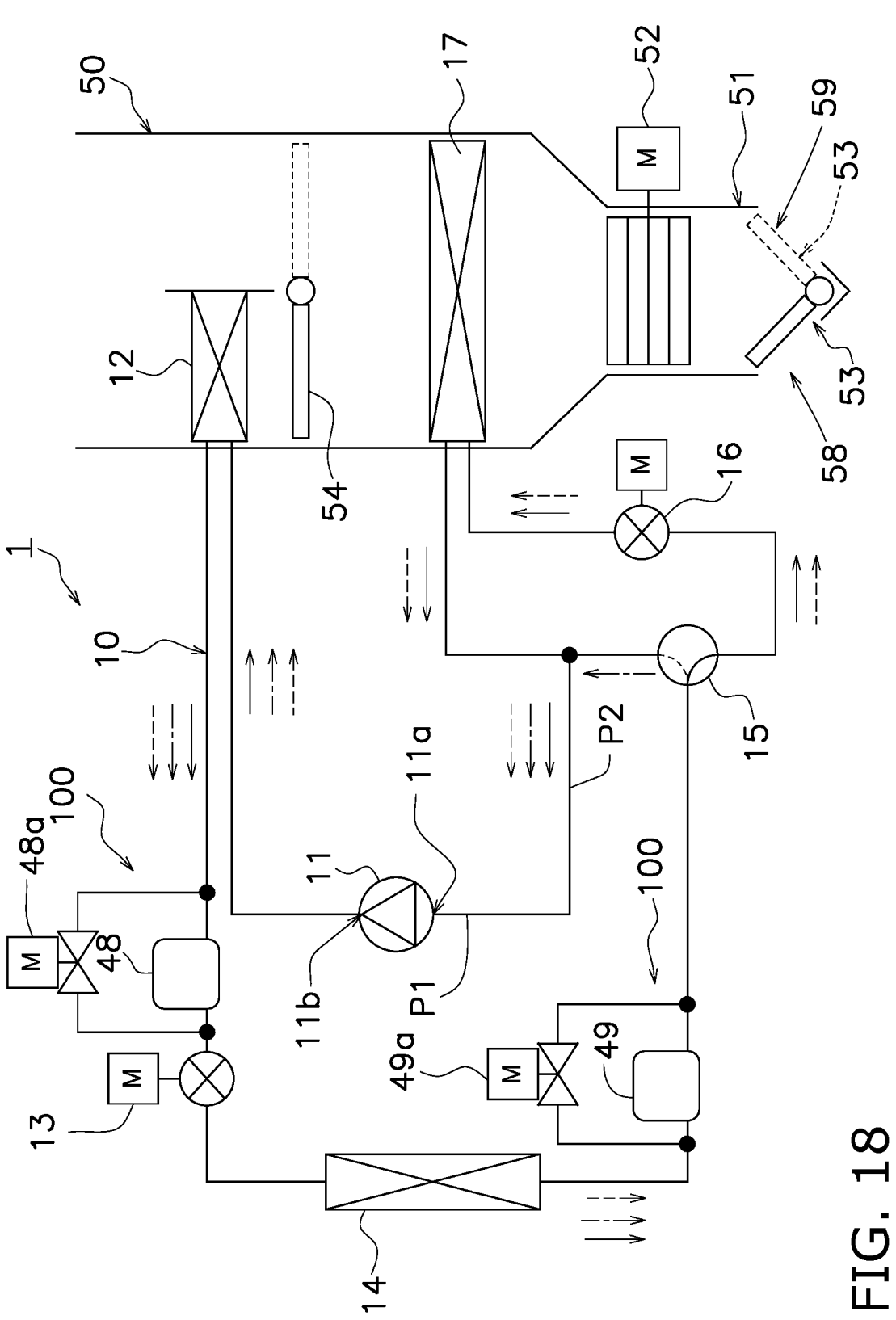
FIG. 18 is a schematic diagram illustrating another example of the configuration of the air conditioner according to the ninth embodiment.
Figure 19:
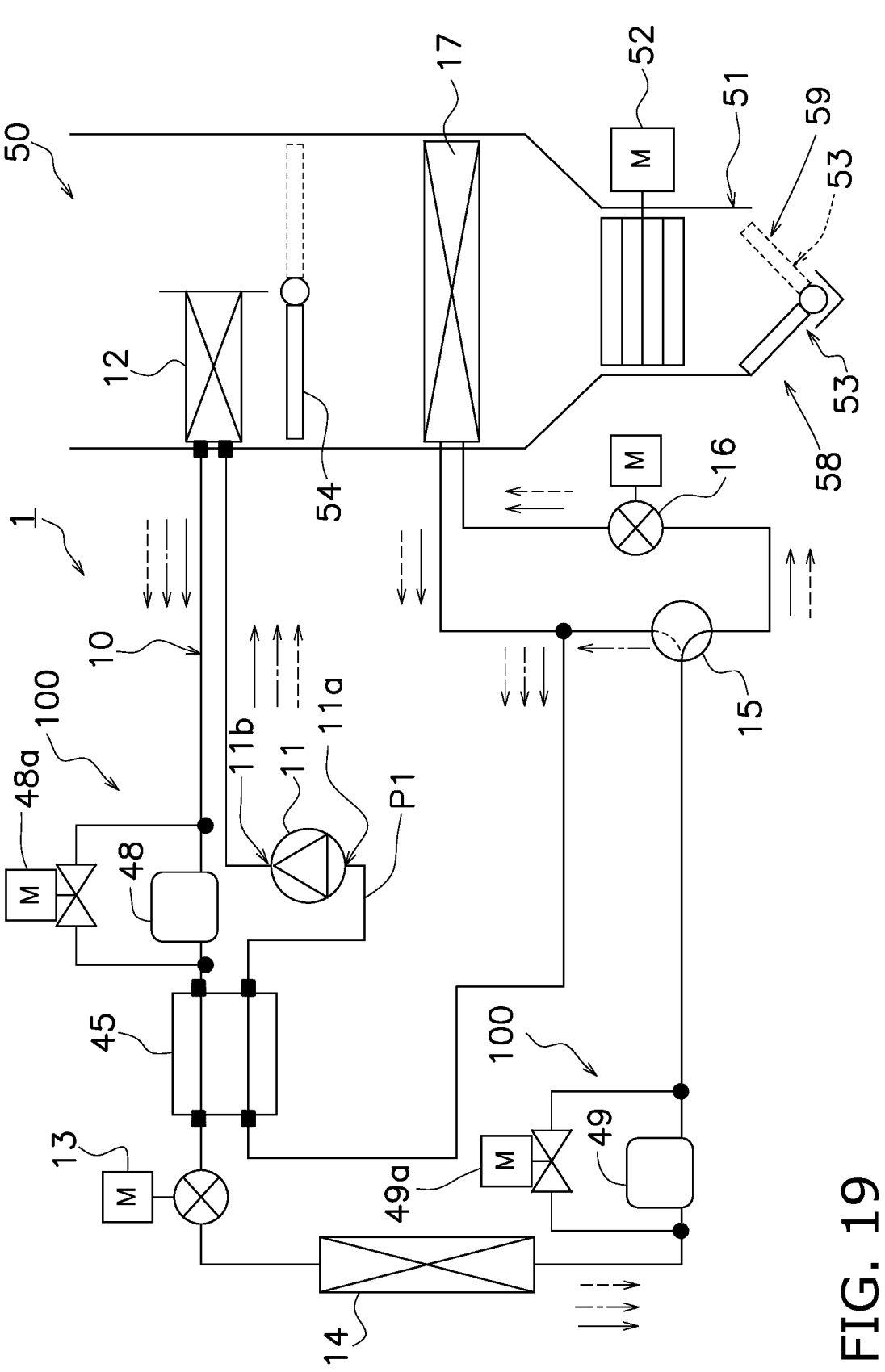
FIG. 19 is a schematic diagram illustrating another example of the configuration of the air conditioner according to the ninth embodiment.

In the composition adjustment mechanism 100 according to a modification 9C of the ninth embodiment, as illustrated in FIGS. 18 and 19, a receiver 49 is also provided between the second heat exchanger 14 and the second expansion valve 16. As illustrated in FIGS. 18 and 19, when the two receivers 48, 49 are used, the liquid non-azeotropic mixture refrigerant is accumulated in the receiver 48 in the heating mode or the dehumidification heating mode, and the liquid non-azeotropic mixture refrigerant is accumulated in the receiver 49 in the cooling mode. In order for the composition adjustment mechanism 100 to perform such an operation, a switching mechanism including on-off valves 48a, 49a is provided. In the cooling mode, the on-off valve 48a is opened to prevent the non-azeotropic mixture refrigerant from flowing into the receiver 48. When the on-off valve 48a is opened, the mixture refrigerant flows while bypassing the receiver 48. In the cooling mode, the on-off valve 49a is closed to block the channel bypassing the receiver 49, and the mixture refrigerant liquefied in the second heat exchanger 14 passes through the receiver 49.

In the heating mode or the dehumidification heating mode, the on-off valve 48a is closed, and the on-off valve 49a is opened. In this case, as described in the ninth embodiment, the liquid mixture refrigerant passes through the receiver 48. At this time, as the on-off valve 49a is opened, the mixture refrigerant flows while bypassing the receiver 49 and does not flow into the receiver 49.

(36) Feature

In the air conditioners 1 according to the ninth embodiment and the modifications 9A, 9B, 9C, the liquid non-azeotropic mixture refrigerant may be accumulated in the receiver 48, or the liquid non-azeotropic mixture refrigerant may be accumulated in the two receivers 48, 49. As the non-azeotropic mixture refrigerant may be accumulated in a liquid state in the receivers 48, 49, for example, it is possible to eliminate the accumulator 20 that performs a function to accumulate the liquid non-azeotropic mixture refrigerant. As changes in the rates of the first refrigerant and the second refrigerant in the non-azeotropic mixture refrigerant are prevented by the receivers 48, 49, the air conditioner 1 may prevent an increase in the rate of the first refrigerant included in the non-azeotropic mixture refrigerant discharged from the compressor 11. Further, even when the accumulator 20 is provided in the air conditioner 1 according to the ninth embodiment, the excess refrigerant may be accumulated in the receivers 48, 49, and therefore it is not necessary to accumulate the excess refrigerant in the accumulator 20, so that the amount of liquid non-azeotropic mixture refrigerant accumulated in the accumulator 20 may be reduced. As a result, by preventing an increase in the rate of the first refrigerant included in the non-azeotropic mixture refrigerant discharged from the compressor 11, it is possible to prevent an increase in the risk of disproportionation reaction. Further, the air conditioners 1 according to the ninth embodiment and the modifications 9A, 9B, 9C are examples of a heat pump apparatus.

Furthermore, when the first refrigerant is flammable, it is possible to prevent an increase in the flammability of the mixture refrigerant circulating in the refrigerant circuit 10 by preventing an increase in the rate of the first refrigerant. In addition, by preventing an increase in the rate of the first refrigerant, it is possible to prevent a reduction in the efficiency and capacity of the air conditioner 1 due to an inappropriate composition of the mixture refrigerant circulating in the refrigerant circuit 10 caused by a higher rate of the first refrigerant. Furthermore, by preventing an increase in the rate of the first refrigerant, it is possible to prevent the difficulty in detailed control on the air conditioner 1 due to an inappropriate composition of the mixture refrigerant circulating in the refrigerant circuit 10 caused by a higher rate of the first refrigerant.

Although the embodiment of the present disclosure has been described above, it is understood that various modifications may be made to forms and details without departing from the spirit and scope of the present disclosure described in the scope of claims.

REFERENCE SIGNS LIST

1 Air conditioner 1 (example of heat pump apparatus)
10 Refrigerant circuit
11 Compressor
12 First heat exchanger (example of indoor heat exchanger)
20 Accumulator
21 Liquid accumulation portion
23 Outlet pipe
23e Outlet end
23h Opening
23i Inlet end
24 Inlet pipe
30 Expansion mechanism
34 Small-diameter pipe
35 Refrigerant introduction channel
35a Blow-out port
35 b Intake port
40 Bypass channel
41 On-off valve
45 Internal heat exchanger
48, 49 Receiver
90 Controller (example of control unit)
100 Composition adjustment mechanism
110, 120, 130 Extraction mechanism
140, 150 Stirring mechanism

P1 First channel
P2 Second channel
P1a Small-diameter portion

CITATION LIST

Patent Literature

PTL 1: Patent No. 6390431

The invention claimed is:

1. A heat pump apparatus comprising:
a refrigerant circuit that circulates a non-azeotropic mixture refrigerant including a first refrigerant and a second refrigerant having a boiling point higher than the first refrigerant;
a compressor provided in the refrigerant circuit to compress the non-azeotropic mixture refrigerant;
a composition adjustment mechanism provided in the refrigerant circuit to prevent an increase in a rate of the first refrigerant included in the non-azeotropic mixture refrigerant discharged from the compressor, and
an accumulator that is provided in the refrigerant circuit and includes a first channel connected to a suction port of the compressor and an outlet connected to the first channel, wherein
the first refrigerant is a compound represented by a molecular formula having one or more carbon-carbon unsaturated bonds, and
the composition adjustment mechanism prevents an increase in a rate of the first refrigerant entering the suction port of the compressor as compared with a rate of the first refrigerant included in the non-azeotropic mixture refrigerant entering the accumulator.

2. The heat pump apparatus according to claim 1, wherein
the accumulator includes a liquid accumulation portion in which the liquid non-azeotropic mixture refrigerant is accumulated, and
the composition adjustment mechanism is an extraction mechanism that communicates the first channel with the liquid accumulation portion, extracts the liquid non-azeotropic mixture refrigerant from the liquid accumulation portion, and flows the non-azeotropic mixture refrigerant to the first channel.

3. The heat pump apparatus according to claim 2, wherein the extraction mechanism includes an expansion mechanism that expands the liquid non-azeotropic mixture refrigerant flowing through the extraction mechanism.

4. The heat pump apparatus according to claim 2, wherein the extraction mechanism includes a small-diameter portion provided in the first channel and a small-diameter pipe connecting the liquid accumulation portion and the small-diameter portion,
the small-diameter portion has an inner diameter smaller than an inner diameter of the first channel upstream of the small-diameter portion and an inner diameter of the first channel downstream of the small-diameter portion, and
the small-diameter pipe has an inner diameter smaller than an inner diameter of the small-diameter portion.

5. The heat pump apparatus according to claim 2, wherein the accumulator includes an outlet pipe that is provided at the outlet and is connected to the first channel,
the outlet pipe includes an outlet end connected to the suction port of the compressor and an inlet end located inside the accumulator, and
the extraction mechanism is an opening formed at a predetermined area of the outlet pipe located in the liquid accumulation portion.

6. The heat pump apparatus according to claim 1, wherein the composition adjustment mechanism includes a refrigerant introduction channel that has a blow-out port connected to the accumulator and an intake port connected to an area in the refrigerant circuit that stirs the non-azeotropic mixture refrigerant in the accumulator.

7. The heat pump apparatus according to claim 6, wherein the accumulator includes an inlet pipe provided near an inner wall to introduce the non-azeotropic mixture refrigerant into inside, and the refrigerant introduction channel has a structure of the inlet pipe that blows out the non-azeotropic mixture refrigerant in a direction intersecting a gravity direction along the inner wall of the accumulator.

8. The heat pump apparatus according to claim 6, wherein the refrigerant introduction channel has a pressure higher than a pressure in the accumulator and flows the non-azeotropic mixture refrigerant from the intake port to the blow-out port.

9. The heat pump apparatus according to claim 1, wherein the composition adjustment mechanism includes an internal heat exchanger that exchanges heat with the non-azeotropic mixture refrigerant flowing through the first channel to heat the non-azeotropic mixture refrigerant.

10. The heat pump apparatus according to claim 1, wherein the refrigerant circuit includes a second channel that flows the non-azeotropic mixture refrigerant entering the accumulator, the composition adjustment mechanism includes a bypass channel that is connected to the first channel and the second channel and bypasses the accumulator, an on-off valve that opens and closes the bypass channel, and a controller that controls the on-off valve, and the controller performs control to open the on-off valve when the accumulator is in a predetermined operation in which a rate of the first refrigerant included in the non-azeotropic mixture refrigerant flowing through the first channel increases as compared with a rate of the first refrigerant included in the non-azeotropic mixture refrigerant flowing through the second channel.

11. The heat pump apparatus according to claim 1, wherein the composition adjustment mechanism includes a controller that has a predetermined mode to control a three-way valve related to the non-azeotropic mixture refrigerant in the refrigerant circuit and increase a suction superheat at the suction port of the compressor, and the controller shifts to the predetermined mode when the liquid non-azeotropic mixture refrigerant is accumulated in the accumulator.

12. The heat pump apparatus according to claim 1, wherein the composition adjustment mechanism is a receiver that is provided in a high-pressure portion of the refrigerant circuit that has a pressure higher than the suction port of the compressor and passes the first refrigerant and the second refrigerant in the non-azeotropic mixture refrigerant without changing the rates of the first refrigerant and the second refrigerant.

13. The heat pump apparatus according to claim 1, wherein the non-azeotropic mixture refrigerant comprises trans-1,2-difluoroethylene as the first refrigerant.

14. The heat pump apparatus according to claim 1, wherein the non-azeotropic mixture refrigerant comprises trifluoroethylene as the first refrigerant.

15. The heat pump apparatus according to claim 1, comprising an indoor heat exchanger that is provided in the refrigerant circuit to exchange heat between the non-azeotropic mixture refrigerant discharged from the compressor and air inside a cabin of an electric vehicle.

16. The heat pump apparatus according to claim 3, wherein the extraction mechanism includes a small-diameter portion provided in the first channel and a small-diameter pipe connecting the liquid accumulation portion and the small-diameter portion, the small-diameter portion has an inner diameter smaller than an inner diameter of the first channel upstream of the small-diameter portion and an inner diameter of the first channel downstream of the small-diameter portion, and the small-diameter pipe has an inner diameter smaller than an inner diameter of the small-diameter portion.

17. The heat pump apparatus according to claim 3, wherein the accumulator includes an outlet pipe that is provided at the outlet and is connected to the first channel, the outlet pipe includes an outlet end connected to the suction port of the compressor and an inlet end located inside the accumulator, and the extraction mechanism is an opening formed at a predetermined area of the outlet pipe located in the liquid accumulation portion.

18. The heat pump apparatus according to claim 4, wherein the accumulator includes an outlet pipe that is provided at the outlet and is connected to the first channel, the outlet pipe includes an outlet end connected to the suction port of the compressor and an inlet end located inside the accumulator, and the extraction mechanism is an opening formed at a predetermined area of the outlet pipe located in the liquid accumulation portion.

19. The heat pump apparatus according to claim 2, wherein the composition adjustment mechanism includes an inlet pipe provided near an inner wall of the accumulator that stirs the non-azeotropic mixture refrigerant in the accumulator.

* * * * *